(12) United States Patent
Takeda et al.

(10) Patent No.: US 11,874,138 B2
(45) Date of Patent: Jan. 16, 2024

(54) INFORMATION PROCESSING APPARATUS, INFORMATION PROCESSING METHOD, AND PROGRAM

(71) Applicant: SONY CORPORATION, Tokyo (JP)

(72) Inventors: Haruto Takeda, Tokyo (JP); Kosei Yamashita, Kanagawa (JP); Hiroyuki Kamata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/258,642

(22) PCT Filed: Aug. 15, 2019

(86) PCT No.: PCT/JP2019/032013
§ 371 (c)(1),
(2) Date: Jan. 7, 2021

(87) PCT Pub. No.: WO2020/045099
PCT Pub. Date: Mar. 5, 2020

(65) Prior Publication Data
US 2021/0270635 A1    Sep. 2, 2021

Related U.S. Application Data

(60) Provisional application No. 62/723,937, filed on Aug. 28, 2018.

(51) Int. Cl.
*G01D 3/08* (2006.01)
*G01C 21/16* (2006.01)
(Continued)

(52) U.S. Cl.
CPC .............. *G01D 3/08* (2013.01); *G01C 21/165* (2013.01); *G01C 25/005* (2013.01); *G06F 18/2113* (2023.01); *G06F 18/251* (2023.01)

(58) Field of Classification Search
CPC .... G01C 25/005; G01C 21/165; G06K 9/623; G06K 9/6289; G01D 3/08; G01D 1/04; G01D 3/036
(Continued)

(56) References Cited

U.S. PATENT DOCUMENTS

2003/0187623 A1    10/2003    Bayard
2005/0160211 A1    7/2005    Kadowaki
(Continued)

FOREIGN PATENT DOCUMENTS

CN    106342175 B    11/2013
CN    104199061 A    12/2014
(Continued)

OTHER PUBLICATIONS

English translation for JP-2011108111-A (Year: 2011).*
(Continued)

*Primary Examiner* — Nasima Monsur
*Assistant Examiner* — Byung Ro Lee
(74) *Attorney, Agent, or Firm* — Paratus Law Group, PLLC

(57) ABSTRACT

An information processing apparatus, an information processing method, and a program, the information processing apparatus and the information processing method appropriately combining observation values of a plurality of sensors according to noise characteristics of the plurality of sensors and a condition for the observation values. An Allan variance is calculated as the characteristics of each of the plurality of sensors. A time window length for an Allan variance is specified as a condition used when the observation values of the plurality of sensors are combined. A weight for each of the plurality of sensors is calculated such that a sum of the Allan variances for the specified time window length is smallest. The respective observation val-
(Continued)

ues of the plurality of sensors are combined using a sum of products of the observation values of the plurality of sensors and the weights calculated for each corresponding sensor of the plurality of sensors.

15 Claims, 15 Drawing Sheets

(51) Int. Cl.
    *G01C 25/00* (2006.01)
    *G06F 18/25* (2023.01)
    *G06F 18/2113* (2023.01)

(58) Field of Classification Search
    USPC .......................................................... 702/150
    See application file for complete search history.

(56) References Cited

U.S. PATENT DOCUMENTS

| | | | |
|---|---|---|---|
| 2012/0173195 A1 | 7/2012 | Opshaug et al. | |
| 2014/0005975 A1* | 1/2014 | Ruizenaar | G01C 19/5776 |
| | | | 702/150 |
| 2016/0273921 A1* | 9/2016 | Zhou | G01C 21/1656 |
| 2017/0127242 A1* | 5/2017 | Arora | G01C 21/165 |

FOREIGN PATENT DOCUMENTS

| | | |
|---|---|---|
| CN | 104280047 A | 1/2015 |
| EP | 2492637 A1 | 8/2012 |
| JP | 2007-143226 A | 6/2007 |
| JP | 2011-108111 A | 6/2011 |
| JP | 2014-507628 A | 3/2014 |

OTHER PUBLICATIONS

Skog et al., Inertial Sensor Arrays, Maximum Likelihood, and Cramér-Rao Bound, IEEE Transactions on Signal Processing, Apr. 2016, pp. 1-11, vol. 64, No. 16, IEEE.

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/032013 (filed on Aug. 15, 2019) under 35 U.S.C. § 371, which claims priority to U.S. Provisional Patent Application No. 62/723,937 (filed on Aug. 28, 2018), which are all hereby incorporated by reference in their entirety.

TECHNICAL FIELD

The present disclosure relates to an information processing apparatus, an information processing method, and a program, and, in particular, to an information processing apparatus, an information processing method, and a program, the information processing apparatus and the information processing method making it possible to appropriately combine observation values of a plurality of sensors according to the noise characteristics of the plurality of sensors and a condition for the observation values.

BACKGROUND ART

A technology has been proposed that includes a plurality of sensors as represented by, for example, inertial measurement units (IMUs) and improves the detection accuracy by combining observation values of the plurality of sensors.

For example, a technology that verifies, using a theoretical analysis, simulation, and an actual measurement value, that the accuracy in an estimation value of an angular velocity is improved by combining observation values of a multi-IMU including a centrifugal force, has been proposed as a technology that combines observation values of a plurality of sensors (refer to Non-Patent Literature 1).

CITATION LIST

Patent Literature

Non-Patent Literature

Non-Patent Literature 1: Isaac Skog, et. al.: Inertial Sensor Arrays, Maximum Likelihood, and Cramer-Rao Bound, IEEE Transactions on Signal Processing 64(16) 2016.

DISCLOSURE OF INVENTION

Technical Problem

However, the technology disclosed in Non-Patent Literature 1 does not perform customization or optimization using a difference in noise characteristics among respective IMUs.

The present disclosure has been achieved in view of the circumstances described above, and, in particular, the present disclosure makes it possible to appropriately combine observation values of a plurality of sensors according to the noise characteristics of the plurality of sensors and a condition for the observation values.

Solution to Problem

An information processing apparatus and a program according to an aspect of the present disclosure are an information processing apparatus that includes a weight combiner that combines respective observation values of a plurality of sensors using a sum of products of the observation values of the plurality of sensors and weights, each weight being calculated for a corresponding one of the plurality of sensors on the basis of the observation value of the corresponding one of the plurality of sensors and characteristics of the corresponding one of the plurality of sensors; and outputs a value obtained by the combining as a combining observation value.

An information processing method according to an aspect of the present disclosure is an information processing method that includes performing weight-combining processing that includes combining respective observation values of a plurality of sensors using a sum of products of the observation values of the plurality of sensors and weights, each weight being calculated for a corresponding one of the plurality of sensors on the basis of the observation value of the corresponding one of the plurality of sensors and characteristics of the corresponding one of the plurality of sensors; and outputting a value obtained by the combining as a combining observation value.

In an aspect of the present disclosure, respective observation values of a plurality of sensors are combined using a sum of products of the observation values of the plurality of sensors and weights, each weight being calculated for a corresponding one of the plurality of sensors on the basis of the observation value of the corresponding one of the plurality of sensors and characteristics of the corresponding one of the plurality of sensors; and a value obtained by the combining is output as a combining observation value.

MODE(S) FOR CARRYING OUT THE INVENTION

Figure 1:
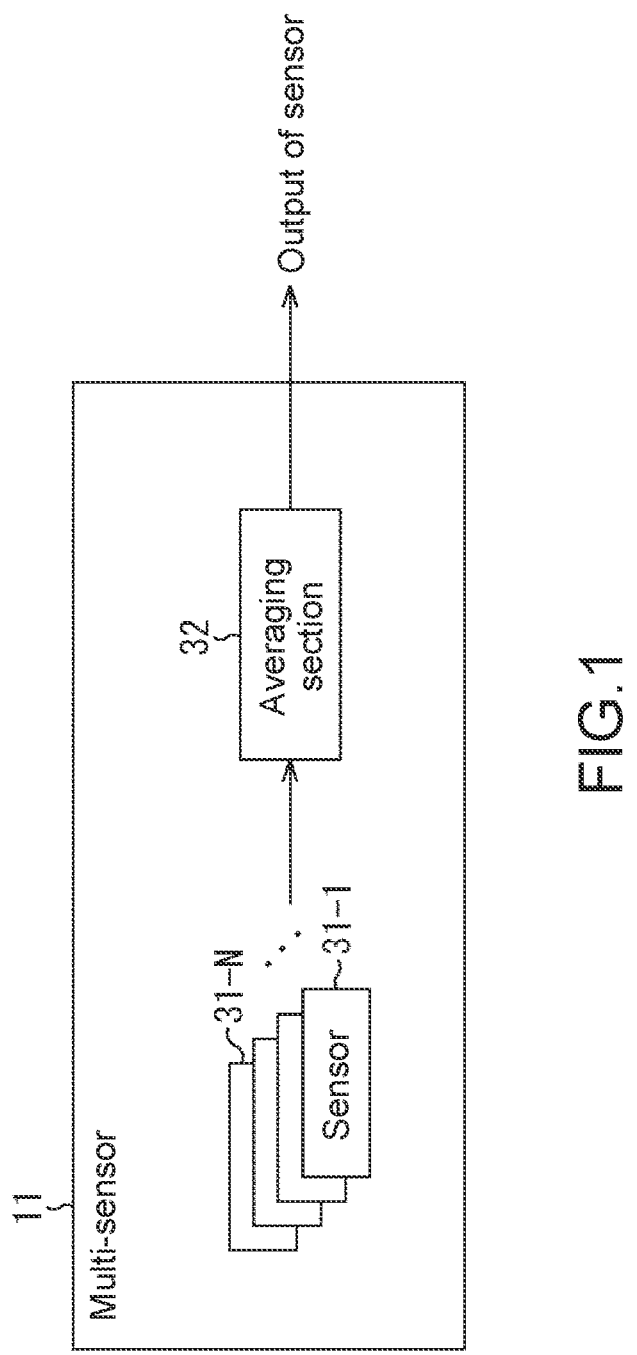
FIG. 1 illustrates a configuration example of a multi-sensor that averages observation values of a plurality of sensors.

Favorable embodiments of the present disclosure will be described in detail with reference to the accompanying drawings. Note that, in the specification and the drawings, components having substantially the same functional configuration are denoted by the same reference numeral to omit a repetitive description.

Embodiments for carrying out the present technology are described below. The description is made in the following order.

1. Outline of Disclosure
2. First Embodiment
3. Second Embodiment
4. Third Embodiment
5. Example in Which Series of Processes is Performed Using Software

1. Outline of Disclosure

The present disclosure makes it possible to appropriately combine observation values of a plurality of sensors according to the noise characteristics of the plurality of sensors and a condition for the observation values.

First, an outline of the present disclosure is described.

An apparatus that includes a plurality of sensors sensing an identical parameter, and combines observation values of the plurality of sensors to output the combined observation values in the form of a single observation value is generally referred to as a multi-sensor.

For example, the multi-sensor used to reduce white noise has a configuration illustrated in FIG. 1.

In other words, a multi-sensor 11 of FIG. 1 includes a plurality of sensors 31-1 to 31-N and an averaging section 32.

Note that the sensors 31-1 to 31-N are simply referred to as a sensor 31 when there is particularly no need to distinguish among the sensors 31-1 to 31-N, and the same applies to a component other than the sensor 31.

The plurality of sensors 31-1 to 31-N is a plurality of sensors detecting, for example, acceleration or an angular velocity as an identical parameter, and each outputting a corresponding observation value to the averaging section 32.

The averaging section 32 averages the observation values from the plurality of sensors 31-1 to 31-N, and outputs a value obtained by the averaging as an observation value of the multi-sensor 11.

When the multi-sensor 11 serves as, for example, a multi-IMU (inertial measurement unit), output of the multi-sensor 11 is output of the multi-IMU, and an average of acceleration and an average of an angular velocity of the sensors 31-1 to 31-N are output.

However, there is a possibility that the multi-sensor 11 of FIG. 1 will not necessarily make it possible to achieve a reduction in noise other than white noise, such as quantization noise, flicker noise, and a random walk, although the multi-sensor 11 of FIG. 1 makes it possible to achieve a reduction in white noise.

Further, in the case of the multi-sensor 11 of FIG. 1, an adjustment depending on the noise characteristics of each of the plurality of sensors 31-1 to 31-N is not performed. Furthermore, an adjustment depending on a condition indicating what adjustment that increases the immunity to which type of noise is necessary, is not performed according to the purpose of use of observation values of the plurality of sensors 31-1 to 31-N.

Thus, in the multi-sensor of the present disclosure, weights for observation values of a plurality of sensors are set on the basis of the noise characteristics of the plurality of sensors and a condition depending on the purpose of use of the observation values, and the observation values are appropriately combined on the basis of the set weights to be output.

Specifically, for example, a multi-sensor 51 of the present disclosure includes sensors 61-1 to 61-N, a weight calculator 62, and a weight combiner 63.

The sensors 61-1 to 61-N observe (detect) an identical parameter, and respectively output observation values $X_1(t)$ to $X_N(t)$ to the weight calculator 62.

The weight calculator 62 acquires the observation values of the respective sensors 61-1 to 61-N, and calculates noise statistics of each of the sensors. Then, the weight calculator 62 selectively uses the noise statistics on the basis of a condition depending on the purpose of use, calculates weights $w_1$ to $w_N$ of the respective sensors 61-1 to 61-N ($0 \le w_1, w_2, w_3, \ldots, w_N \le 1$, $w_1+w_2+w_3+\ldots+w_N=1$), and outputs the calculated weights to the weight combiner 63.

The weight combiner 63 combines the observation values $X_1(t)$ to $X_N(t)$ on the basis of the weights $w_1$ to $w_N$ supplied by the weight calculator 62, and outputs a result of the combining ($\Sigma w_1 X_n(t)$) as an observation value $Y(t)$ of the multi-sensor 51.

Here, the noise statistics are described.

For example, an Allan variance is used as the noise statistics.

The Allan variance is a variance $\sigma$ corresponding to a time window length $\tau$. Note that, in FIG. 3, the vertical axis represents the square root of an Allan variance (root Allan variance) $\sigma$, and the horizontal axis represents a time window length $\tau$.

Noise is predominantly observed for a specific time window length $\tau$ of an Allan variance $\sigma$.

Figure 3:
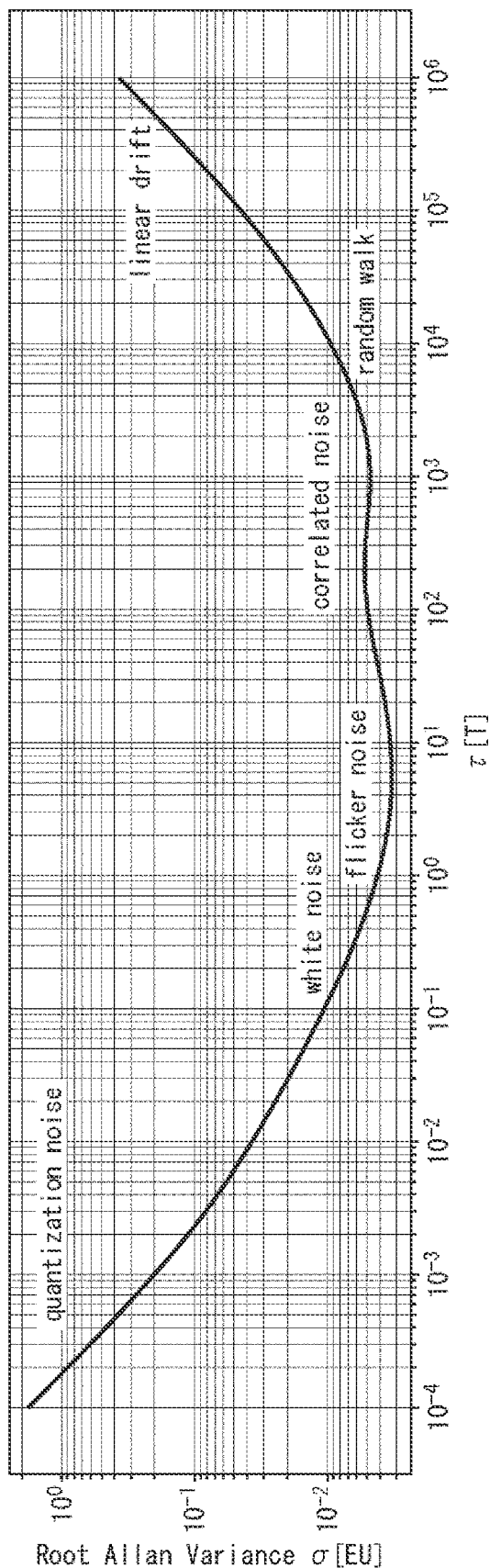
FIG. 3 is a diagram describing a relationship between an Allan variance and noise.

Thus, as illustrated in FIG. 3, when the time window length $\tau$ is near $10^{-3}$, quantization noise that is a quantization error caused by an AD conversion is predominantly observed, and when the time window length $\tau$ is near $10^{-1}$, white noise that is noise exhibiting ideally flat frequency characteristics is predominantly observed.

Further, when the time window length $\tau$ is near $10^0$, flicker noise that is noise having a frequency spectrum in which the noise is steadily made smaller for a higher frequency component, is predominantly observed, and when the time window length $\tau$ is near $10^2$, noise (correlated noise) that is band-limited noise is predominantly observed.

Moreover, a random walk is predominantly observed when the time window length is near $10^4$, and drift (linear drift) that varies with a constant gradient is predominantly observed when the time window length is near $10^6$.

As described above, with respect to an Allan variance, the type of noise predominantly observed differs depending on the time window length $\tau$. Further, noise becomes dominant as the time window length $\tau$ of an Allan variance is reduced, and the bias stability becomes dominant as the time window length $\tau$ is increased.

Thus, for example, in order to reduce quantization noise upon obtaining an observation value of the multi-sensor 11, the weight calculator 62 calculates each of the weights $w_1$ to $w_N$ ($w_1+w_2+w_3+\ldots+w_N=1$) such that an Allan variance for the time window length $\tau$ near $10^{-3}$ that is noise statistics of each of the sensors 61-1 to 61-N is smallest.

In order to reduce quantization noise, the weight combiner 63 combines the observation values $X_1(t)$ to $X_N(t)$ using the weights $w_1$ to $w_N$, each of the weights $w_1$ to $w_N$ being a weight with which the Allan variance in which quantization noise is predominantly observed, is smallest. Then, the weight combiner 63 outputs a result of the combining ($\Sigma w_1 X_n(t)$) as an observation value $Y(t)$ of the multi-sensor 51.

Likewise, in the case of other types of noise, a weight is calculated such that an Allan variance for the time window length $\tau$ in which a specific type of noise is predominantly observed, is smallest.

Then, observation values of the respective sensors 61-1 to 61-N are combined using the weights calculated such that a reduction-target type of noise depending on the purpose of use of an observation value of the multi-sensor 11, is reduced.

This processing makes it possible to set a weight with which an Allan variance for the time window length $\tau$ in which noise depending on the purpose of use is predominantly observed, the weight being based on the noise characteristics of each of the plurality of sensors 61-1 to 61-N in the multi-sensor 11. This makes it possible to appropriately combine observation values of the plurality of sensors 61-1 to 61-N according to the noise characteristics of the respective sensors 61-1 to 61-N and according to the purpose of use of an observation value obtained by combining the observation values of the sensors 61-1 to 61-N.

When the purpose of use of an observation value is, for example, to apply, to inertial navigation, the observation value combined with an observation signal from the outside such as a GPS or a camera, a relatively longer time window length $\tau$ is set to be a condition to set weights in order to reduce a bias variation in the observation signal.

On the other hand, when the purpose of use of an observation value is, for example, to simply apply the observation value to inertial navigation without using an observation signal from the outside such as an GPS or a camera, or to apply the observation value in order to obtain an azimuth angle from the direction of a rotation of the earth, a relatively shorter time window length $\tau$ is set to set weights.

2. First Embodiment

Configuration Example of Multi-Sensor

Next, a configuration example of hardware of a multi-sensor of the present disclosure is described with reference to a block diagram of FIG. 4.

Figure 4:
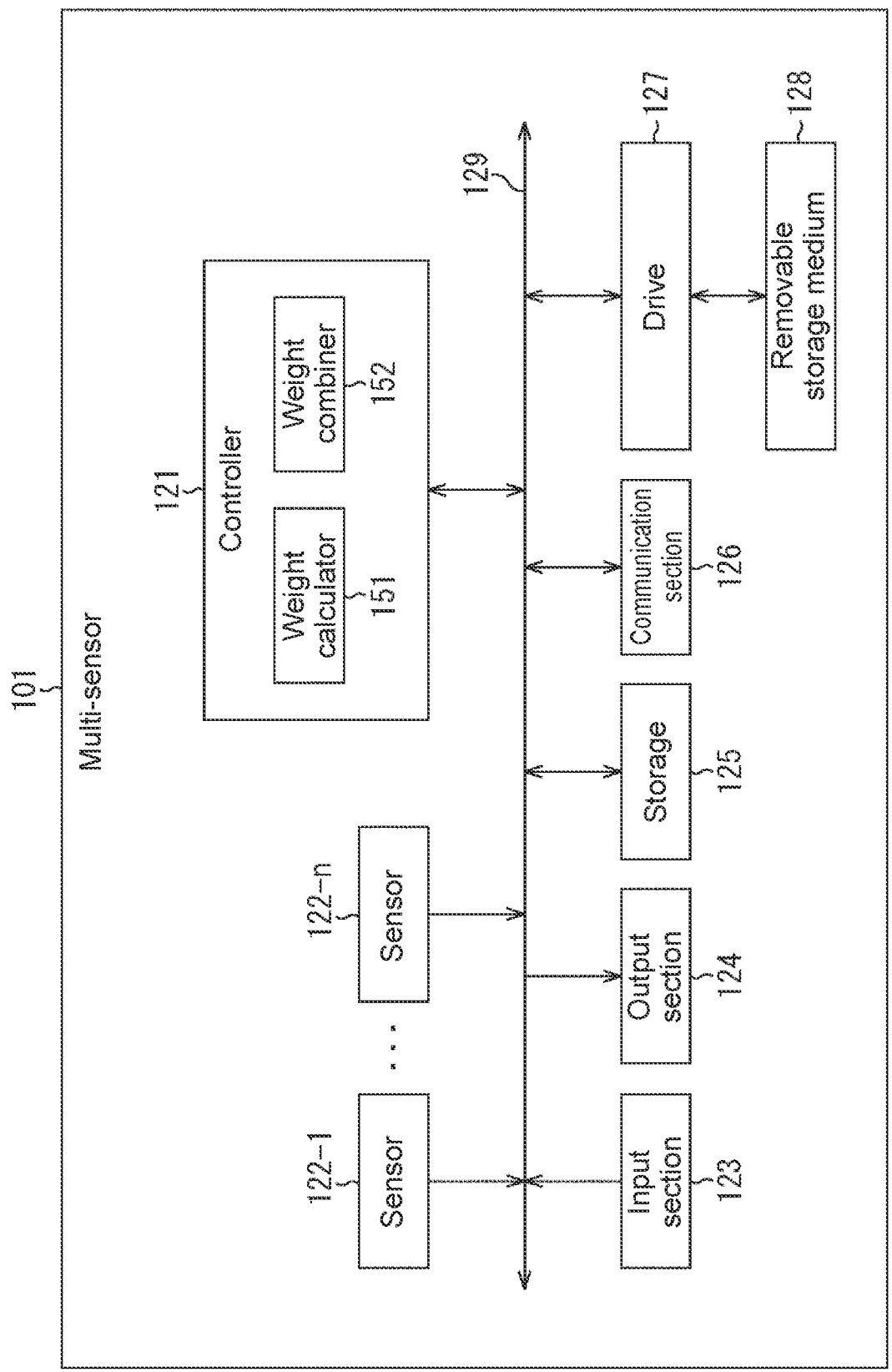
FIG. 4 is a hardware diagram illustrating a configuration example of a multi-sensor of the present disclosure.

A multi-sensor 101 of FIG. 4 includes a controller 121, sensors 122-1 to 122-N, an input section 123, an output section 124, a storage 125, a communication section 126, a drive 127, and a removable storage medium 128, and these components are connected to each other via a bus 129, and are capable of transmitting and receiving data and a program.

The control section 121 includes a processor and a memory, and controls an entire operation of the multi-sensor 101. The control section 121 includes a weight calculator 151 and a weight combiner 152.

Figure 2:
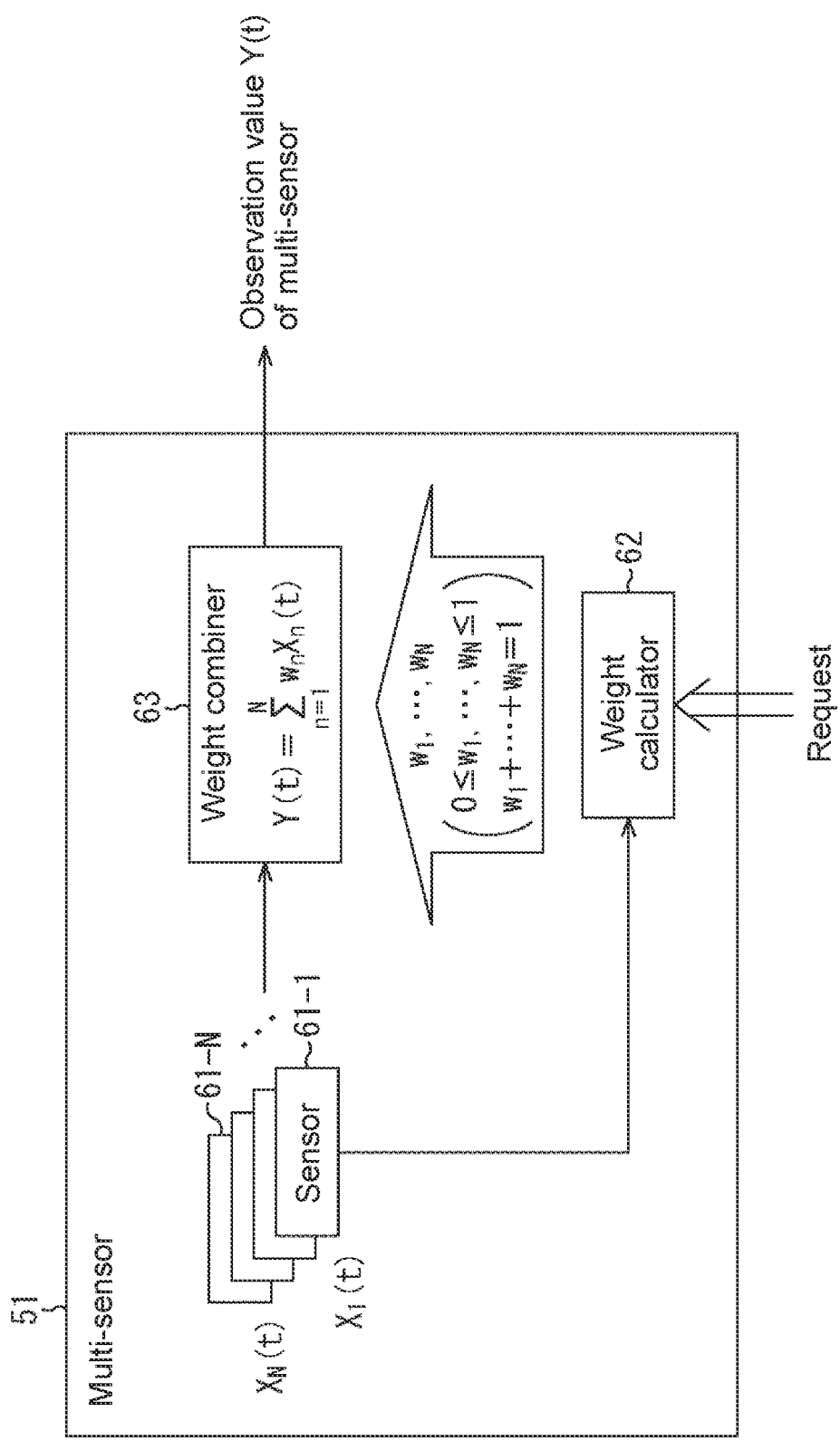
FIG. 2 is a diagram describing an outline of the present disclosure.

The weight calculator 151 corresponds to the weight calculator 62 of FIG. 2. On the basis of observation values of the respective sensors 122-1 to 122-n, the weight calculator 151 calculates the noise characteristics of the respective sensors 122-1 to 122-n in the form of noise statistics. Here, the sensors 122-1 to 122-n are, for example, inertial measurement units (IMUs), and respectively correspond to the sensors 61-1 to 61-N of FIG. 2.

Then, on the basis of necessary noise statistics, and according to the application of use or the purpose of use of an observation value of the multi-sensor 101, the weight calculator 151 calculates weights and outputs the calculated weights to the weight combiner 152.

On the basis of the weights supplied by the weight calculator 151, the weight combiner 152 combines results of sensings performed by the sensors 122-1 to 122-n and outputs the combined sensing results as a sensing result of the multi-sensor 101.

Note that configuration examples of functions of the weight calculator 151 and the weight combiner 152 that are implemented by the controller 121 will be described in detail later with reference to FIG. 5.

The input section 123 includes input devices such as a keyboard and a mouse that are used by a user to input an operation command, and supplies various input signals to the controller 121.

The output section 124 is controlled by the controller 121. The output section 124 outputs, to a display device (not illustrated), a supplied operation screen and a supplied image of a processing result, and displays them on the display device.

The storage 125 includes a hard disk drive (HDD), a solid state drive (SSD), a semiconductor memory, or the like. The storage 125 is controlled by the controller 121, and writes or reads various data including content data, and a program.

The communication section 126 is controlled by the controller 121, and transmits/receives various data and a program to/from various apparatuses by wire (or wirelessly (not illustrated)) through a communication network as represented by a local area network (LAN) or the like.

The drive 127 reads data from and writes data into the removable storage medium 128 such as a magnetic disk (including a flexible disk), an optical disk (including a compact disc read-only memory (CD-ROM) and a digital versatile disc (DVD)), a magneto-optical disk (including a mini disc (MD)), or a semiconductor memory.

First Configuration Example of Functions of Weight Calculator and Weight Combiner Next, a first configuration example of functions of the weight calculator 151 and the weight combiner 152 that are implemented by the controller 121 of the multi-sensor 101 of FIG. 4 is described with reference to FIG. 5.

The weight calculator 151 includes an Allan variance calculator 171 and a weight determination section 172.

The Allan variance calculator 171 variously changes the time window length $\tau$ to calculate an Allan variance as noise-statistics information based on an observation value of each of the offline sensors 122-1 to 122-n, and stores therein the calculated Allan variance as the noise characteristics of each of the sensors 122-1 to 122-n.

On the basis of an Allan variance that is the noise characteristics of each of the sensors 122-1 to 122-n, and on the basis of a condition specified by a user, the weight determination section 172 determines weights $w_1$ to $w_n$ of observation values of the sensors 122-1 to 122-n, and outputs the determined weights to the weight combiner 152. A weight determination method according to a condition will be described in detail later.

The weight combiner 152 includes a weight-combining calculator 191.

The weight-combining calculator 191 calculates, as an observation value Y(t) of the multi-sensor 101, a sum of products of observation values $X_1(t)$ to $X_n(t)$ of the sensors 122-1 to 122-n and the weights $w_1$ to $w_n$ supplied by the weight determination section 172 (a weighted sum), using Formula (1) indicated below.

[Formula 1]

$$Y(t) = \sum_{n=1}^{N} w_n X_n(t) \quad \|w\| = 1 \quad w_n \geq 0 \tag{1}$$

In other words, the weight-combining calculator 191 performs calculation using Formula (1) to combine the observation values $X_1(t)$ to $X_n(t)$ of the sensors 122-1 to 122-n using the weights $w_1$ to $w_n$ supplied by the weight determination section 172, and outputs a value obtained by the combining as an observation value Y(t) of the multi-sensor 101.

Note that the weight calculator 151 may be implemented as a function in a cloud server or the like connected to the multi-sensor 101 through a network, and not implemented as a function of the multi-sensor 101 itself. In other words, in this case, the weight-combining calculator 191 of the weight combiner 152 acquires the weights $w_1$ to $w_n$ in the weight calculator 151 in the cloud server through the network, the weights $w_1$ to $w_n$ being calculated according to the characteristics of the respective sensors 122-1 to 122-n. Then, the weight-combining calculator 191 may perform calculation using Formula (1) to combine the observation values $X_1(t)$ to $X_n(t)$ of the sensors 122-1 to 122-n using the weights $w_1$ to $w_n$ acquired from the cloud server, and may output a value obtained by the combining as the observation value Y(t) of the multi-sensor 101.

(Weight Determination Method when Time Window Length τ is Specified)

Next, the weight determination method when the input section 123 is operated and the time window length τ is specified as a condition is described.

When the time window length τ is specified as a condition, the type of noise to be adjusted is virtually specified, as described with reference to FIG. 3.

In other words, a corresponding time window length τ can be considered to be specified when the type of noise is specified.

When the time window length τ is specified, the weight determination section 172 determines, on the basis of Formula (2) indicated below, weights $w_1$ to $w_n$ used to obtain an observation value Y(t) that is a result of the weight-combining calculation performed using Formula (1) described above, the weights $w_1$ to $w_n$ being weights when an Allan variance σ for the specified time window length τ is smallest.

[Formula 2]

$$f(w) = \min_\tau \sigma(\tau; Y) \tag{2}$$

Here, f(w) is a function represented using the weights $w_1$ to $w_n$ when an Allan variance σ(τ;Y) of the observation value Y(t) for the time window length τ is smallest, the observation value Y(t) being a result of combining the observation values $X_1(t)$ to $X_n(t)$ of the sensors 122-1 to 122-n.

Further, the Allan variance σ(τ;Y) of the observation value Y(t) for the time window length τ is represented by Formula (3) indicated below.

[Formula 3]

$$\sigma(\tau, Y) = \sum_{n=1}^{N} w_n^2 \sigma(\tau; X_n) \tag{3}$$

Here, $w_n$ is a weight of the sensor 122-n and $X_n(t)$ is an observation value of the sensor 122-n.

In other words, the Allan variance σ(τ;Y) of the observation value Y(t) using the weight $w_n$ calculated on the basis of the Allan variance for the time window length τ is a sum of squares of the weights $w_n$ of Allan variances σ(τ;X) of the sensors 122-n with respect to the time window length τ, the observation value Y(t) being a result of combining the observation values $X_1(t)$ to $X_n(t)$ of the sensors 122-1 to 122-n.

In other words, the weight determination section 172 calculates the weights $w_1$ to $w_n$ such that a sum of products of the Allan variances σ(t;X) of the respective sensors 122 with respect to the time window length τ and the squares of the weights $w_n$ is smallest.

The observation values $X_1(t)$ to $X_n(t)$ of the respective sensors 122-1 to 122-n are combined using the weights $w_1$ to $w_n$ determined described above, and this results in making the Allan variance σ(τ;Y) of the observation value Y(t) smallest, the observation value Y(t) being a combining result with respect to the time window length τ.

This results in being able to reduce an effect of the characteristics of noise of a type specified by the time window length τ, according to the noise characteristics of the respective sensors 122-1 to 122-n.

Further, the condition may include the number of sensors to be operated from among the sensors 122-1 to 122-n.

In other words, for example, it is assumed that, during operation, only 50 sensors 122 that are half of 100 sensors 122 in total are operated and the other 50 sensors 122 are stopped, in order to achieve power savings.

In this case, according to the noise characteristics based on Allan variances of all of the 100 sensors 122, the weight determination section 172 sets, to zero, weights for observation values of the 50 sensors 122 to be stopped, and calculates how to assign weights to observation values of the other 50 sensors 122 to be operated.

Specifically, from among the Allan variances of all of the 100 sensors 122 for a specified time window length τ, the weight determination section 172 determines that the sensors 122 of the 50 largest Allan variances are to be stopped, and sets, to zero, weights for the sensors 122 to be stopped. Then, with respect to the other 50 sensors 122 to be operated, the weight determination section 172 calculates weights such that a sum of products of the Allan variances of the other 50 sensors 122 to be operated and the squares of the weights is smallest.

Accordingly, it is possible to achieve power savings by stopping the operations of the 50 sensors 122 for which weights are set to zero, and to perform an optimal weight-combining due to the sensor characteristics of the other 50 sensors 122 to be operated.

Note that, with respect to the example in which there exist 100 sensors 122, the 50 sensors 122 are stopped, and the other 50 sensors 122 are operated, the total number of sensors 122, and the number of sensors 122 to be stopped or the number of sensors 122 to be operated are not limited to this example, and other numbers may be adopted.

(Weight Determination Method when Time Window Length τ is not Specified)

Next, the weight determination method when the time window length τ is not specified as a condition is described. When the time window length τ is not specified as a condition, the type of noise to be adjusted is virtually not specified, as described with reference to FIG. 3.

In other words, when the type of noise is not specified, there is a need to determine a weight together with an optimal time window length τ for setting the weight.

When the time window length τ is not specified, the weight determination section 172 determines the weights $w_1$ to $w_n$ using a formula of an Allan variance represented using a noise parameter based on a noise model, as represented by Formula (4) indicated below.

[Formula 4]

Allan variance:

$$g(\tau; \Theta) = \frac{3\sigma_Q^2}{\tau^2} + \frac{\sigma_v^2}{\tau} + \frac{2\log 2 \sigma_f^2}{\pi} + B_{BN}(\tau; \sigma_n^2, T_B) + \frac{\sigma_u^2 \tau}{3} + \frac{R^2 \tau^2}{2} \quad (4)$$

Here, $g(\tau;\Theta)$ is an Allan variance represented using a noise parameter $\Theta$ based on a noise model (noise theory), the noise parameter $\Theta$ being a noise parameter for the time window length τ.

In Formula (4), the first term represents an Allan variance of quantization noise, where $\sigma_Q$ is a noise parameter of the quantization noise.

Further, the second term represents an Allan variance of white noise, where $\sigma_v$ is a noise parameter of the white noise.

Furthermore, the third term represents an Allan variance of flicker noise (1/f noise), where $\sigma_f$ is a noise parameter of the flicker noise.

Moreover, the fourth term represents an Allan variance of correlated noise $B_{BN}$, where $\sigma_n$ and $T_B$ are noise parameters of the correlated noise $B_{BN}$.

Further, the fifth term represents an Allan variance of a random walk, where $\sigma_u$ is a noise parameter of the random walk.

Furthermore, the sixth term represents an Allan variance of linear drift, where R is a noise parameter of the linear drift.

Note that an Allan variance of the type of noise represented in each term of Formula (4) corresponds to an Allan variance of the type of noise depending on the time window length τ in FIG. 3, the type of noise depending on the time window length τ being illustrated in order from the left in the figure. Further, the noise parameter $\Theta$ is ($\sigma_Q$, $\sigma_v$, $\sigma_f$, $\sigma_n$, $T_B$, $\sigma_u$, R).

The weight determination section 172 defines a function $F(\Theta)$ represented by Formula (5) indicated below, and calculates a noise parameter $\Theta$ that makes the function $F(\Theta)$ smallest, the function $F(\Theta)$ being a difference between an Allan variance of each of the observation values $X_1(t)$ to $X_n(t)$ of the sensors 122-1 to 122-$n$ and an Allan variance represented using the noise parameter $\Theta$ based on a noise model.

[Formula 5]

$$F(\Theta) = \sum_{k=1}^{K} (\log \sigma_k^2 - \log g(\tau_k; \Theta))^2 \quad (5)$$

$$\Theta = \{\sigma_Q, \sigma_v, \sigma_f, \sigma_n, \sigma_B, \sigma_u, R\}$$

Here, $\sigma_K$ in the first term in parentheses is an Allan variance for a time window length $\tau_K$, which is calculated from the observation value $X_n(t)$ of the sensor 122-$n$ in a stationary state, and $g(\tau_K;\Theta)$ in the second term is an Allan variance for the time window length $\tau_K$, which is represented using a noise parameter $\Theta$ based on a noise model.

In other words, Formula (5) is a general solution for least-squares estimation that is used to obtain a noise parameter $\Theta$ by fitting an Allan variance obtained from an observation value of the sensor 122 to an Allan variance represented using a noise parameter $\Theta$ based on a noise model formed of a nonlinear function.

Thus, the weight determination section 172 fixes a time window length τ, obtains an Allan variance $g(\tau;\Theta)$, and obtains a weight using the obtained Allan variance $g(\tau;\Theta)$.

Next, the weight determination section 172 fixes the obtained weight to obtain a smallest time window length τ.

The weight determination section 172 fixes the obtained smallest time window length τ again, obtains an Allan variance $g(\tau;\Theta)$, and obtains a weight using the obtained Allan variance $g(\tau;\Theta)$.

Then, the weight determination section 172 fixes the obtained weight again, and obtains a smallest time window length τ.

Using the so-called Newton-Rapson method, the weight determination section 172 repeatedly performs the processing described above until convergence is performed with respect to the time window length τ, and thus calculates a convergent time window length τ and weights $w_1$ to $w_n$ corresponding to the convergent time window length τ to output the calculated time window length and weights. Note that the calculation method may be not only the Newton-Rapson method but also another method as long as it is a general numerical calculation method. For example, the method may be the Levenberg-Marquardt.

Even when the time window length τ is not specified, the processing described above makes it possible to calculate an appropriate time window length τ and weights $w_1$ to $w_n$ corresponding to the appropriate time window length τ according to the noise characteristics of the sensor 122.

Note that, also in this case, the number of sensors 122 to be used may be specified as a condition.

Further, the example in which, when the time window length τ is not specified, a time window length τ and a weight are obtained using an Allan variance represented using a noise parameter $\Theta$ based on a model has been described above. However, theoretically, the time window length τ and the weight can also be obtained using a commonly used Allan-variance formula.

Further, a sparse constraint may be set, in Formula (2) described above, by adding a regularization term with respect to a weight, and the weight may be estimated.

<Weight Calculation Processing Performed when Time Window Length is Specified (Part 1-1)>

Next, weight calculation processing performed when a time window length is specified is described with reference to a flowchart of FIG. 6.

Note that the weight calculation processing is assumed to be offline processing that is performed at a timing different from a timing at which an observation value is output by the sensor 122. The reason is that there is a need for statistics of an observation value for a sufficiently long time to calculate an Allan variance used to calculate a weight. However, in the weight calculation processing, it is also possible to update an optimal weight depending on a temporal change in the sensor 122 by calculating a weight on the basis of a dynamic Allan variance calculated by performing online processing (real-time processing). For the online processing performed on the Allan variance (real-time processing), see L. Galleani, et al.: Interpretation of the Dynamic Allan Variance of Nonstationary Clock Data. In Proceedings of the IEEE International Frequency Control Symposium, 2007 pp. 992-997.

In Step S11, the weight determination section 172 of the weight calculator 151 receives an input of a condition that is performed by a user operating the input section 123. Here, it is assumed that the time window length τ and the number of sensors 122 to be used are input as conditions.

In Step S12, the Allan variance calculator 171 of the weight calculator 151 measures observation values of all of the sensors 122-1 to 122-$n$ in a stationary state.

In Step S13, the Allan variance calculator 171 of the weight calculator 151 calculates Allan variances of the respective sensors 122-1 to 122-$n$ on the basis of the measured observation values.

In Step S14, the weight determination section 172 of the weight calculator 151 calculates weights $w_1$ to $w_n$ on the basis of the conditions, such that a sum of products of the Allan variances of the sensors 122-1 to 122-$n$ and the weights is smallest.

Here, when the number of sensors 122 to be used is limited, the weight determination section 172 calculates weights with respect to the limited number of sensors 122 such that a sum of products of Allan variances of the limited number of sensors 122 and the weights is smallest.

In this case, which sensor 122 is selected as the sensor 122 of the limited number of sensors 122 and which sensor 122 is not used are determined on the basis of the Allan variance, and then a weight is set for each sensor 122 to be used.

In other words, according to the noise characteristics, a weight for the sensor 122 not to be used is set to zero, and a weight for the sensor 122 of the limited number of sensors 122 to be used is set.

This enables the user to combine appropriate observation values depending on the noise characteristics of an individual sensor 122 with respect to the type of noise the user is aware of.

<Weight Calculation Processing Performed when Time Window Length is not Specified (Part 1-2)>

Next, the weight calculation processing performed when the time window length τ is not specified is described with reference to a flowchart of FIG. 7.

In Step S31, the weight determination section 172 of the weight calculator 151 receives an input of a condition that is performed by a user. Here, it is assumed that only the number of sensors 122 to be used is input as the condition.

In Step S32, the Allan variance calculator 171 of the weight calculator 151 measures observation values of all of the sensors 122-1 to 122-$n$ in a stationary state.

In Step S33, the Allan variance calculator 171 of the weight calculator 151 calculates Allan variances of the respective sensors 122-1 to 122-$n$ on the basis of the measured observation values.

In Step S34, the weight determination section 172 initializes the time window length τ.

In Step S35, the weight determination section 172 fixes the time window length τ, specifies a noise parameter Θ with which a difference between the Allan variance obtained using the observation value and an Allan variance that is obtained using the noise parameter Θ and described with reference to Formula (4), is smallest, and calculates each of the weights $w_1$ to $w_n$ from the Allan variance modeled by the specified noise parameter Θ.

In Step S36, the weight determination section 172 fixes the obtained weights $w_1$ to $w_n$, and obtains a smallest time window length τ.

In Step S37, the weight determination section 172 determines whether convergence has been performed with respect to the obtained smallest time window length τ using, for example, the Newton method, compared to the case of a most previously obtained smallest time window length τ.

When it has been determined, in Step S37, that the convergence has not been performed, the process moves on to Step S38.

In Step S38, the weight determination section 172 fixes the obtained smallest time window length τ, specifies a noise parameter Θ with which a difference between the Allan variance obtained using the observation value and an Allan variance obtained using the noise parameter Θ is smallest, and calculates each of the weights $w_1$ to $w_n$ from the Allan variance modeled by the specified noise parameter Θ. Then, the process returns to Step S36.

In other words, the processes of Steps S36 to S38 are repeated until it is determined that convergence has been performed with respect to the time window length τ. Processing including fixing obtained weights $w_1$ to $w_n$ and obtaining a smallest time window length τ, and processing including specifying a noise parameter Θ with which a difference between an Allan variance obtained using an observation value and an Allan variance obtained using the noise parameter Θ is smallest, and calculating each of the weights $w_1$ to $w_n$ using the Allan variance modeled by the specified noise parameter Θ, are repeated.

Then, when it has been determined, in Step S37, that convergence has been performed with respect to the time window length τ, the process moves on to Step S39.

In Step S39, the weight determination section 172 outputs, to the weight combiner 152, the weights $w_1$ to $w_n$ calculated by specifying a noise parameter Θ with which a difference between the Allan variance obtained using an observation value and the Allan variance obtained using the noise parameter Θ is smallest, the Allan variance obtained using an observation value being specified upon fixing the time window length τ for which convergence has been determined to be performed due to calculation.

Even when the time window length τ is not specified, the processing described above makes it possible to specify a noise parameter Θ with which a difference between an Allan variance obtained using an observation value and an Allan variance obtained using the noise parameter Θ is smallest, and to calculate weights $w_1$ to $w_n$.

Consequently, even when the time window length τ, that is, the type of noise is not specified, the type of noise in which an Allan variance is smallest is specified, and weights depending on the noise characteristics of the sensors 122-1 to 122-$n$ are calculated with respect to the specified type of noise.

Note that, also in this case, the number of sensors 122 to be used is specified, and this makes it possible to select the sensor 122 to be used, on the basis of the sensor characteristics upon using the specified number of sensors 122, and to calculate weights depending on the noise characteristics of the selected limited number of sensors 122, as in the case described above.

Further, the example in which the weight calculation processing is performed for each of the case in which the time window length τ is specified and the case in which the time window length τ is not specified, has been described above. However, whether the time window length τ has been specified as a condition may be determined, and, on the basis of a result of the determination, switching may be performed between the weight calculation processing of FIG. 6 and the weight calculation processing of FIG. 7 such that the weight calculation processing of FIG. 6 is performed when the time window length τ is specified, and the weight calculation processing of FIG. 7 is performed when the time window length τ is not specified.

<Weight-Combining Processing (Part 1)>

Next, weight-combining processing is described with reference to a flowchart of FIG. 8.

Figure 6:
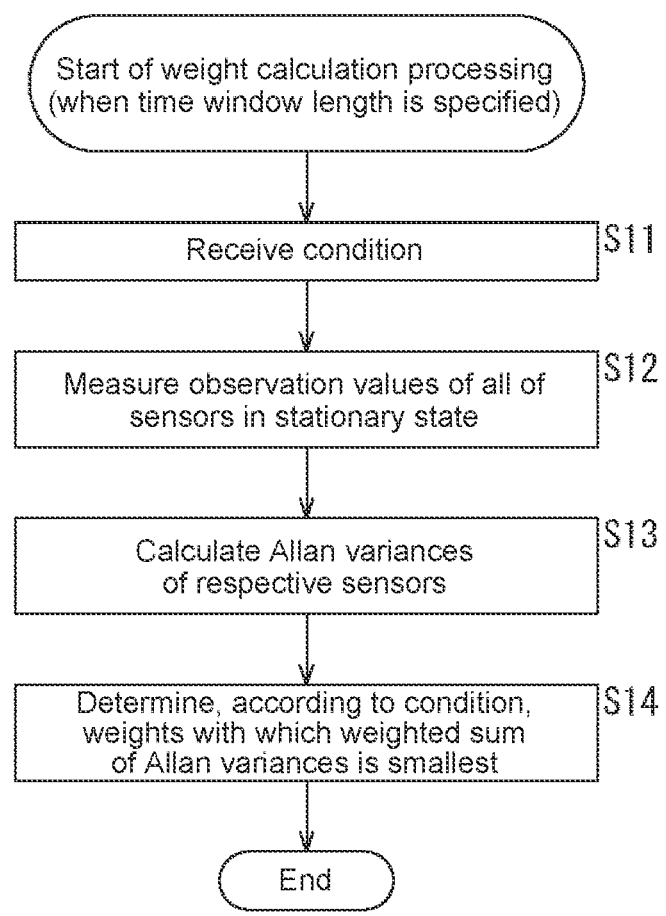
FIG. 6 is a flowchart illustrating weight calculation processing (Part 1-1) performed by the multi-sensor of FIG. 5 when a time window length is specified.
Figure 7:
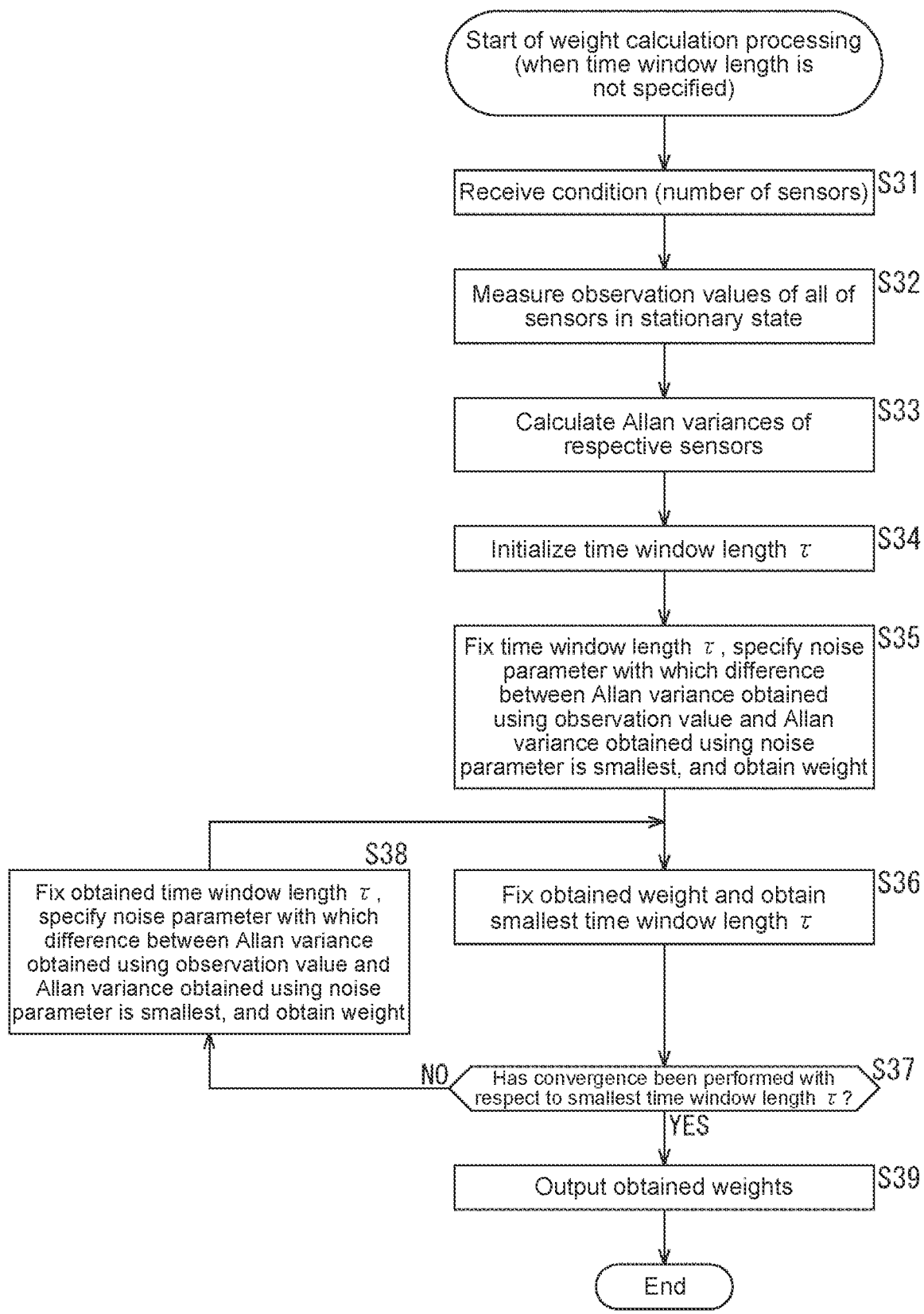
FIG. 7 is a flowchart illustrating the weight calculation processing (Part 1-2) performed by the multi-sensor of FIG. 5 when the time window length is not specified.

Note that this processing is performed on the assumption that the weight calculation processing of FIG. 6 or FIG. 7 described above is performed and this results in weights $w_1$ to $w_n$ being calculated by the weight calculator 151 and in the calculated weights being supplied to the weight-combining calculator 191 of the weight combiner 152.

In Step S51, the weight-combining calculator 191 measures observation values $X_1(t)$ to $X_n(t)$ of all of the sensors 122-1 to 122-n.

In Step S52, the weight-combining calculator 191 obtains a sum of products of the observation values $X_1(t)$ to $X_n(t)$ and the weights $w_1$ to $w_n$, and outputs an obtained value as an observation value $Y(t)$ of the multi-sensor 11.

The processing described above makes it possible to appropriately combine observation results of a plurality of sensors 122 using weights calculated on the basis of a condition and the noise characteristics of the plurality of sensors 122.

3. Second Embodiment

The example in which weights are set according to a condition and the noise characteristics of the sensors 122 using observation values of the sensors 122 without any change, and weight-combining is performed on the observation values, has been described above. However, an observation value may be divided into a high-frequency component and a low-frequency component to set a weight and perform weight-combining with respect to each of the high-frequency component and the low-frequency component, and then the high-frequency component and the low-frequency component may be combined.

Figure 9:
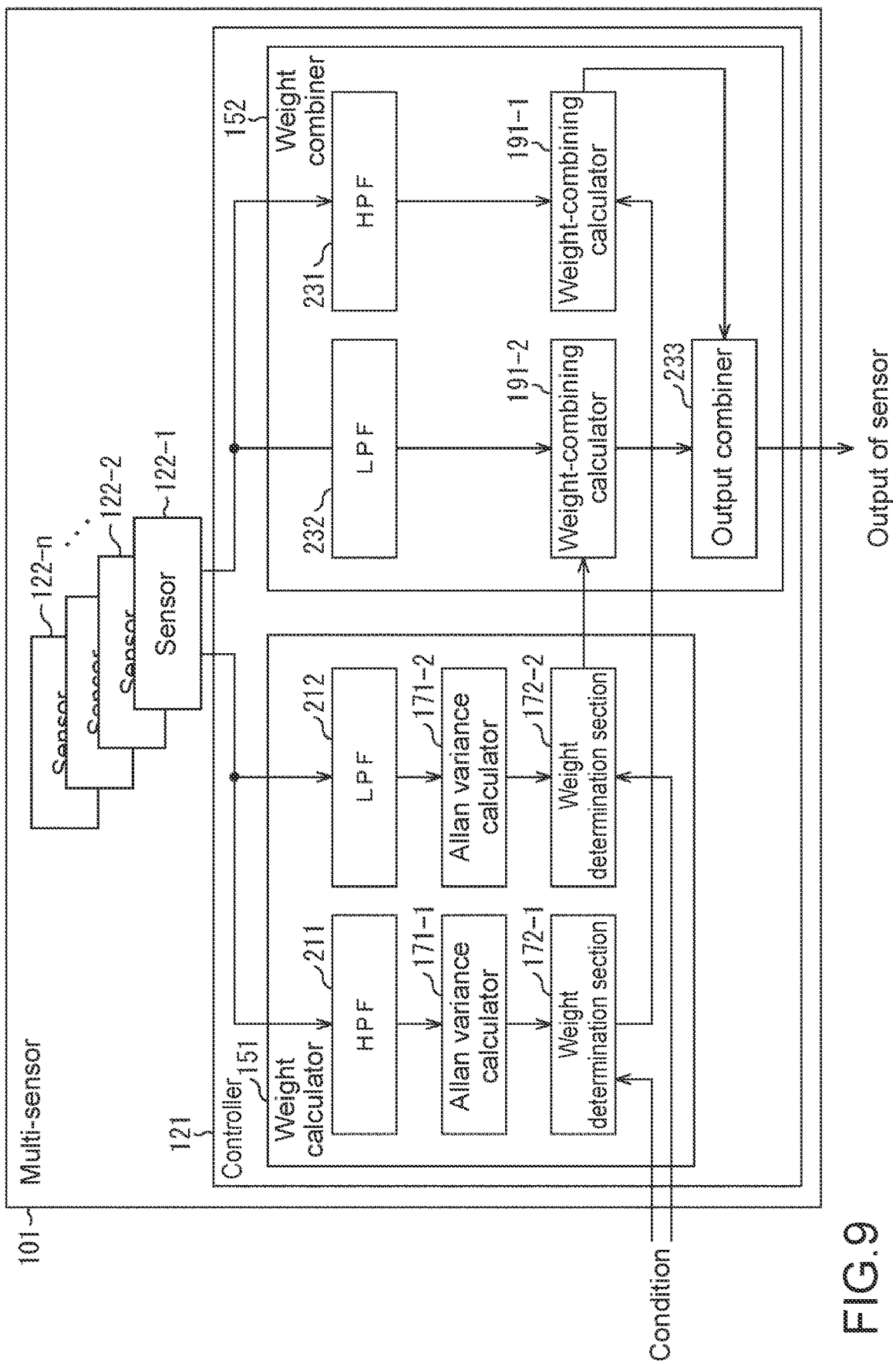
FIG. 9 illustrates a second embodiment of the functions implemented by the multi-sensor of FIG. 4.
Figure 10:
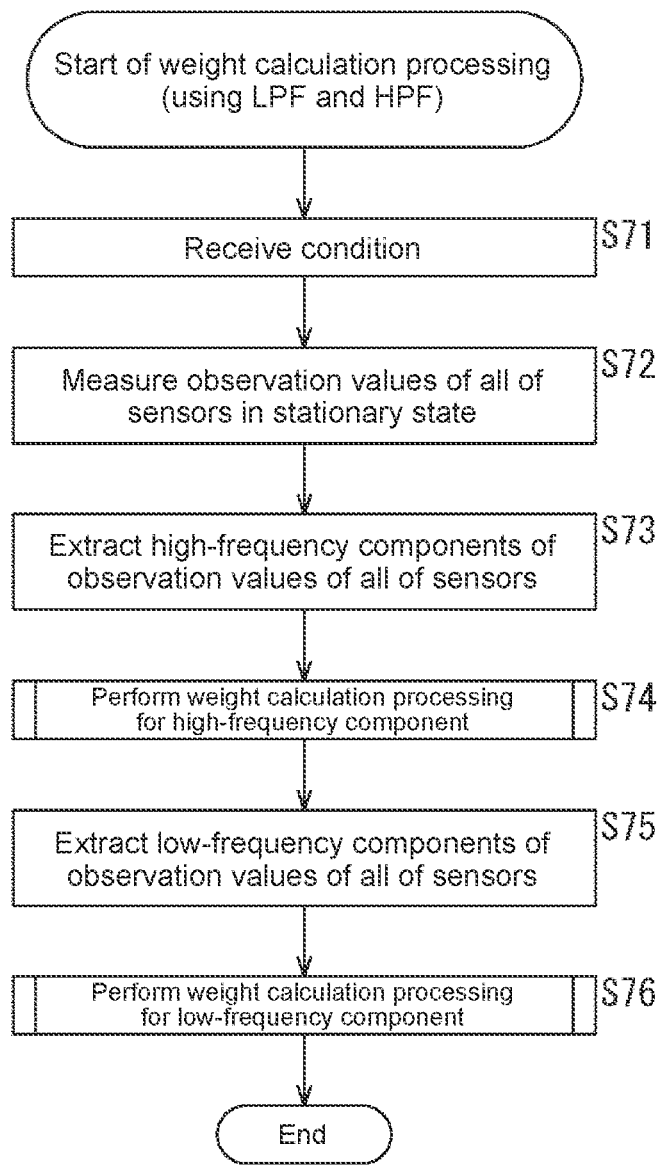
FIG. 10 is a flowchart illustrating the weight calculation processing (Part 2) performed by the multi-sensor of FIG. 9.
Figure 11:
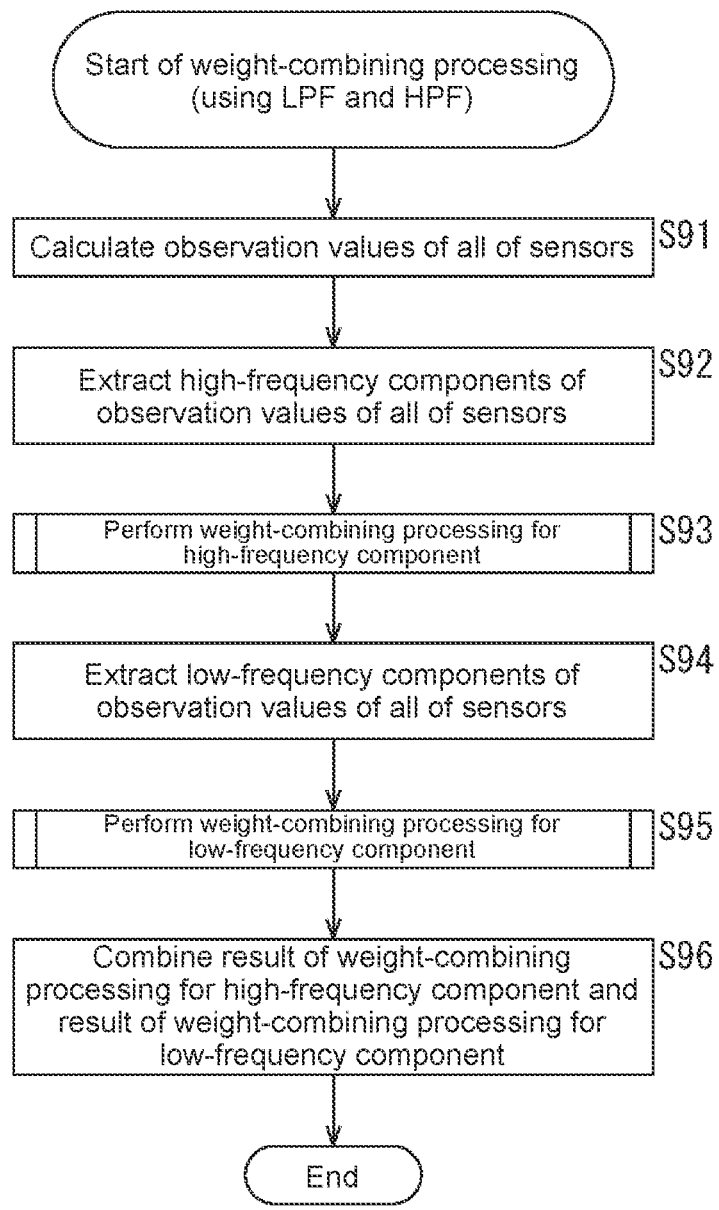
FIG. 11 is a flowchart illustrating the weight-combining processing (Part 2) performed by the multi-sensor of FIG. 9.

FIG. 9 illustrates a configuration example of the multi-sensor 11 in which a weight is set and weight-combining is performed with respect to each of a high-frequency component and a low-frequency component, and then the high-frequency component and the low-frequency component are combined.

Figure 5:
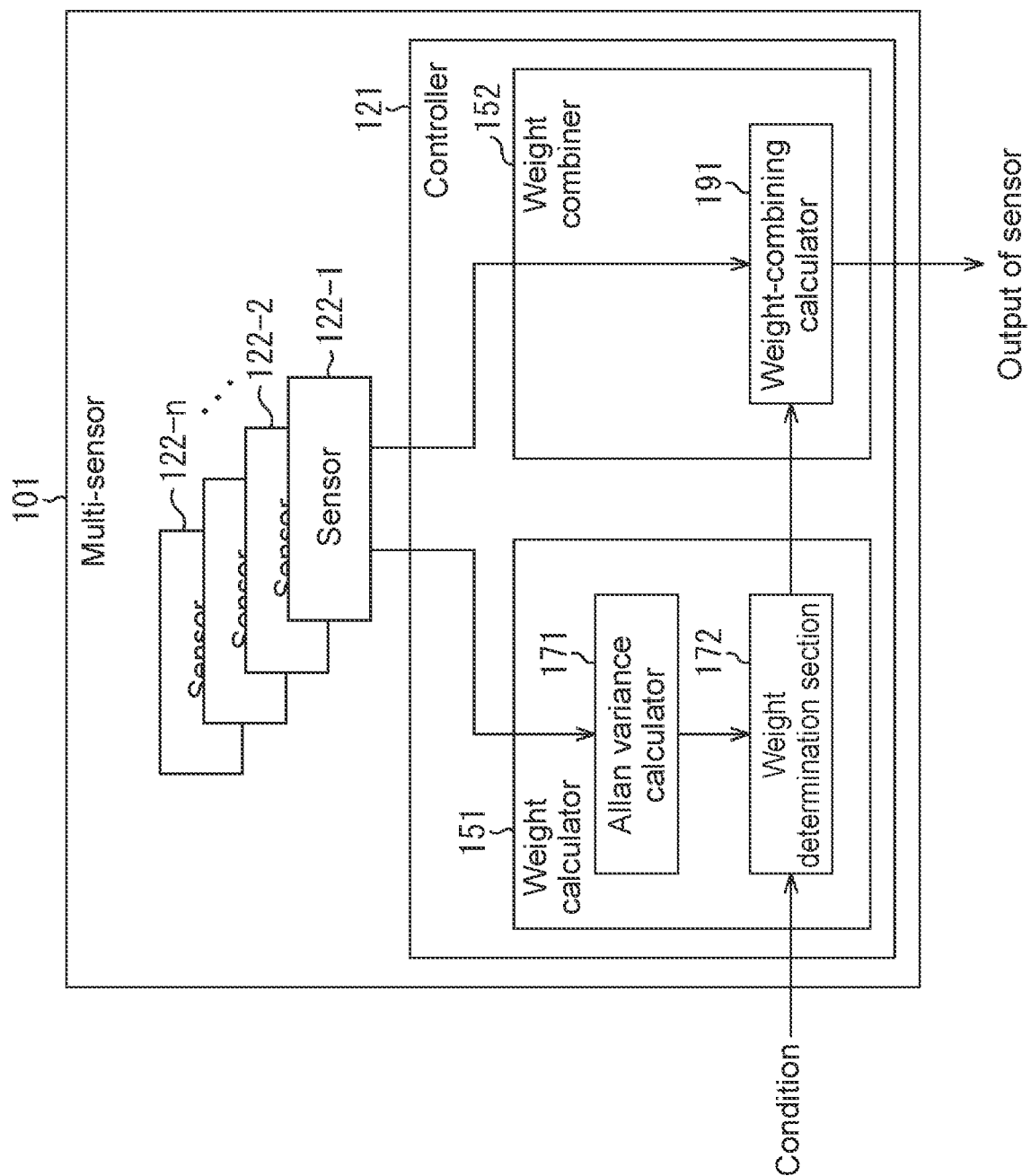
FIG. 5 illustrates a first embodiment of functions implemented by the multi-sensor of FIG. 4.

Note that, in the multi-sensor 11 of FIG. 9, a component having the same function as the component included in the multi-sensor 11 of FIG. 5 is denoted by the same reference numeral as that of FIG. 5, and a description thereof is omitted as appropriate.

In other words, the multi-sensor 11 of FIG. 9 is different from the multi-sensor 11 of FIG. 5 in the following points.

First, the multi-sensor 11 of FIG. 9 is different from the multi-sensor 11 of FIG. 5 in that a high pass filter (HPF) 211 and a low pass filter (LPF) 212 are newly included in the weight calculator 151, and a high pass filter (HPF) 231 and a low pass filter (LPF) 232 are newly included in the weight combiner 152.

Further, the multi-sensor 11 of FIG. 9 is different from the multi-sensor 11 of FIG. 5 in including, instead of the Allan variance calculator 171 and the weight determination section 172, an Allan variance calculator 171-1 and a weight determination section 172-1 that are used to process a high-frequency component, and an Allan variance calculator 171-2 and a weight determination section 172-2 that are used to process a low-frequency component.

Furthermore, the multi-sensor 11 of FIG. 9 is different from the multi-sensor 11 of FIG. 5 in including, instead of the weight-combining calculator 191, a weight-combining calculator 191-1 used to process a high-frequency component and a weight-combining calculator 191-2 used to process a low-frequency component.

Moreover, the multi-sensor 11 of FIG. 9 is different from the multi-sensor 11 of FIG. 5 in newly including an output combiner 233 that combines a result of weight-combining performed by the weight-combining calculator 191-1 and a result of weight-combining performed by the weight-combining calculator 191-2.

In other words, the HPF 211 performs HPF processing on observation values of the respective sensors 122-1 to 122-n to extract high-frequency components, and outputs the high-frequency components to the Allan variance calculator 171-1.

Then, the Allan variance calculator 171-1 and the weight determination section 172-1 determine weights for the high-frequency components from among the noise characteristics of the sensors 122-1 to 122-n, and output the weights to the weight-combining calculator 191-1 of the weight combiner 152.

Further, the LPF 212 performs LPF processing on the observation values of the respective sensors 122-1 to 122-n to extract low-frequency components, and outputs the low-frequency components to the Allan variance calculator 171-2.

Then, the Allan variance calculator 171-2 and the weight determination section 172-2 determine weights for the low-frequency components from among the noise characteristics of the sensors 122-1 to 122-n, and output the weights to the weight-combining calculator 191-2 of the weight combiner 152.

Further, the HPF 231 performs HPF processing on the observation values of the respective sensors 122-1 to 122-n to extract high-frequency components, and outputs the high-frequency components to the weight-combining calculator 191-1.

Then, the weight-combining calculator 191-1 performs weight-combining with respect to the high-frequency components from among the observation values of the sensors 122-1 to 122-n, using the weights supplied by the weight determination section 172-1 of the weight calculator 151, and outputs an obtained value to the output combiner 233.

Further, the LPF 232 performs LPF processing on the observation values of the respective sensors 122-1 to 122-n to extract low-frequency components, and outputs the low-frequency components to the weight-combining calculator 191-2.

Then, the weight-combining calculator 191-2 performs weight-combining with respect to the low-frequency components from among the observation values of the sensors 122-1 to 122-n, using the weights supplied by the weight determination section 172-2 of the weight calculator 151, and outputs an obtained value to the output combiner 233.

The output combiner 233 combines the observation value supplied by the weight-combining calculator 191-1 and the observation value supplied by the weight-combining calculator 191-2 to output a value obtained by the combining, the observation value supplied by the weight-combining calculator 191-1 being obtained by performing weight-combining with respect to the high-frequency components from among the observation values of the sensors 122-1 to 122-$n$, the observation value supplied by the weight-combining calculator 191-2 being obtained by performing weight-combining with respect to the low-frequency components from among the observation values of the sensors 122-1 to 122-$n$.

Such a configuration makes it possible to appropriately perform weight-combining with respect to the high-frequency components of the observation values of the sensors 122-1 to 122-$n$ and weight-combining with respect to the low-frequency components of the observation values of the sensors 122-1 to 122-$n$, according to a condition of a user and the noise characteristics of the sensors 122-1 to 122-$n$, and to combine obtained observation values.

This results in appropriately performing weight-combining with respect to high-frequency components and weight-combining with respect to low-frequency components. Consequently, it is possible to appropriately combine observation values.

<Weight Calculation Processing (Part 2)>

Next, the weight calculation processing performed by the multi-sensor 11 of FIG. 9 using an LPF and an HPF is described.

In Step S71, the weight determination sections 172-1 and 172-2 of the weight calculator 151 respectively receive inputs of conditions from a user. In this case, the weight determination sections 172-1 and 172-2 may respectively receive an input of a condition for a high-frequency component and an input of a condition for a low-frequency component, the condition for a high-frequency component and the condition for a low-frequency component being independent of each other.

In Step S72, each of the HPF 211 and the LPF 212 of the weight calculator 151 measures observation values of the sensors 122-1 to 122-$n$ in a stationary state.

In Step S73, the HPF 211 performs HPF processing on the observation values in the stationary state to extract high-frequency components, and outputs the high-frequency components to the Allan variance calculator 171-1.

In Step S74, the Allan variance calculator 171-1 and the weight determination section 172-1 perform weight calculation processing for a high-frequency component to calculate weights for the respective sensors 122-1 to 122-$n$ with respect to the high-frequency components based on the measured observation values, and output the weights to the weight-combining calculator 191-1.

Note that the weight calculation processing for a high-frequency component is weight calculation processing performed in order to obtain weights for high-frequency components with respect to the respective sensors 122-1 to 122-$n$, and virtually corresponds to the processes of Steps S13 and S14 of FIG. 6 or the processes of Steps S33 to S39 of FIG. 7. Thus, a description thereof is omitted.

In Step S75, the LPF 212 performs LPF processing on the observation values in the stationary state to extract low-frequency components, and outputs the low-frequency components to the Allan variance calculator 171-2.

In Step S76, the Allan variance calculator 171-2 and the weight determination section 172-2 perform weight calculation processing for a low-frequency component to calculate weights for the respective sensors 122-1 to 122-$n$ with respect to the low-frequency components based on the measured observation values, and output the weights to the weight-combining calculator 191-2.

Note that the weight calculation processing for a low-frequency component is weight calculation processing performed in order to obtain weights for low-frequency components with respect to the respective sensors 122-1 to 122-$n$, and virtually corresponds to the processes of Steps S13 and S14 of FIG. 6 or the processes of Steps S33 to S39 of FIG. 7. Thus, a description thereof is omitted.

In this case, the weight determination sections 172-1 and 172-2 may perform setting to limit the number of sensors 122 to be used. Further, with respect to the limit on the number of sensors 122 to be used from among the sensors 122-1 to 122-$n$, the number of sensors 122 to be used for a high-frequency component and the number of sensors 122 to be used for a low-frequency component may be different from each other.

This enables the user to combine appropriate observation values depending on the noise characteristics of an individual sensor 122 with respect to the type of noise the user is aware of under the condition that the time window length $\tau$ is specified, or with respect to noise the user is not aware of under the condition that the time window length $\tau$ is not specified.

Further, it is possible to perform weight-combining with respect to a high-frequency component according to the noise characteristics for the high-frequency component and to perform weight-combining with respect to a low-frequency component according to the noise characteristics for the low-frequency component, the noise characteristics for the high-frequency component and the noise characteristics for the low-frequency component being independent of each other.

<Weight-Combining Processing (Part 2)>

Next, the weight calculation processing performed by the multi-sensor 11 of FIG. 9 using the LPF and the HPF is described.

In Step S91, the HPF 231 and the LPF 232 of the weight combiner 152 measure observation values of the sensors 122-1 to 122-$n$ in a stationary state.

In Step S92, the HPF 231 performs HPF processing on the observation values to extract high-frequency components, and outputs the high-frequency components to the weight-combining calculator 191-1.

In Step S93, the weight-combining calculator 191-1 performs weight-combining processing for a high-frequency component to perform weight-combining with respect to the measured observation values using the weights for the high-frequency components, each weight being obtained by the weight calculation processing described above being performed, and outputs a result of the weight-combining to the output combiner 233.

Figure 8:
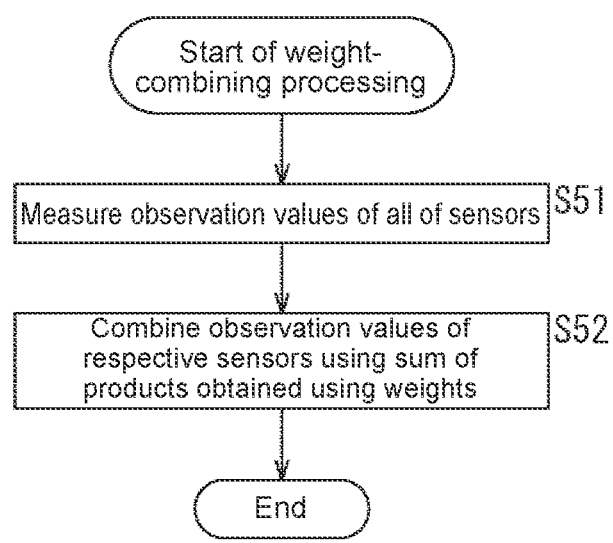
FIG. 8 is a flowchart illustrating weight-combining processing (Part 1) performed by the multi-sensor of FIG. 4.

Note that the process of Step S93 virtually corresponds to the process of Step S52 of FIG. 8 with respect to a high-frequency component. Thus, a description thereof is omitted.

In Step S94, the LPF 232 performs LPF processing on the observation values to extract low-frequency components, and outputs the low-frequency components to the weight-combining calculator 191-2.

In Step S95, the weight-combining calculator 191-2 performs weight-combining processing for a low-frequency component to perform weight-combining with respect to the measured observation values using the weights for the low-frequency components, each weight being obtained by the weight calculation processing described above being performed, and outputs a result of the weight-combining to the output combiner 233.

Note that the process of Step S95 virtually corresponds to the process of Step S52 of FIG. 8 with respect to a high-frequency component. Thus, a description thereof is omitted.

In Step S96, the output combiner 233 combines the result of the weight-combining that is supplied by the weight-combining calculator 191-1 and the result of the weight-combining that is supplied by the weight-combining calculator 191-2 to output a value obtained by the combining as an observation value of the multi-sensor 11, the result of the weight-combining that is supplied by the weight-combining calculator 191-1 being obtained by performing weight-combining with respect to the high-frequency components from among the observation values of the sensors 122-1 to 122-$n$, the result of the weight-combining that is supplied by the weight-combining calculator 191-2 being obtained by performing weight-combining with respect to the low-frequency components from among the observation values of the sensors 122-1 to 122-$n$.

This enables the user to combine appropriate observation values depending on the noise characteristics of an individual sensor 122 with respect to the type of noise the user is aware of under the condition that the time window length $\tau$ is specified, or with respect to noise the user is not aware of under the condition that the time window length $\tau$ is not specified.

Further, it is possible to perform weight-combining with respect to a high-frequency component according to the noise characteristics for the high-frequency component and to perform weight-combining with respect to a low-frequency component according to the noise characteristics for the low-frequency component, the noise characteristics for the high-frequency component and the noise characteristics for the low-frequency component being independent of each other.

4. Third Embodiment

The example in which observation results of the sensors 122-1 to 122-$n$ are each divided into a high-frequency component and a low-frequency component using the HPF and the LPF; the Allan variance is obtained, a weight is set according to a condition, and weight-combining is performed with respect to each component; and then, a result of weight-combining performed with respect to high-frequency components and a result of weight-combining performed with respect to low-frequency components are combined, has been described above.

However, the band may be divided into a larger number of bands using a filter bank (FB) instead of using the HPF and the LPF; an Allan variance may be obtained, a weight may be calculated according to a condition, and weight-combining may be performed with respect to each of the larger number of bands; and then band-combining may be performed with respect to results of the weight-combinings performed on all of the bands.

Figure 12:
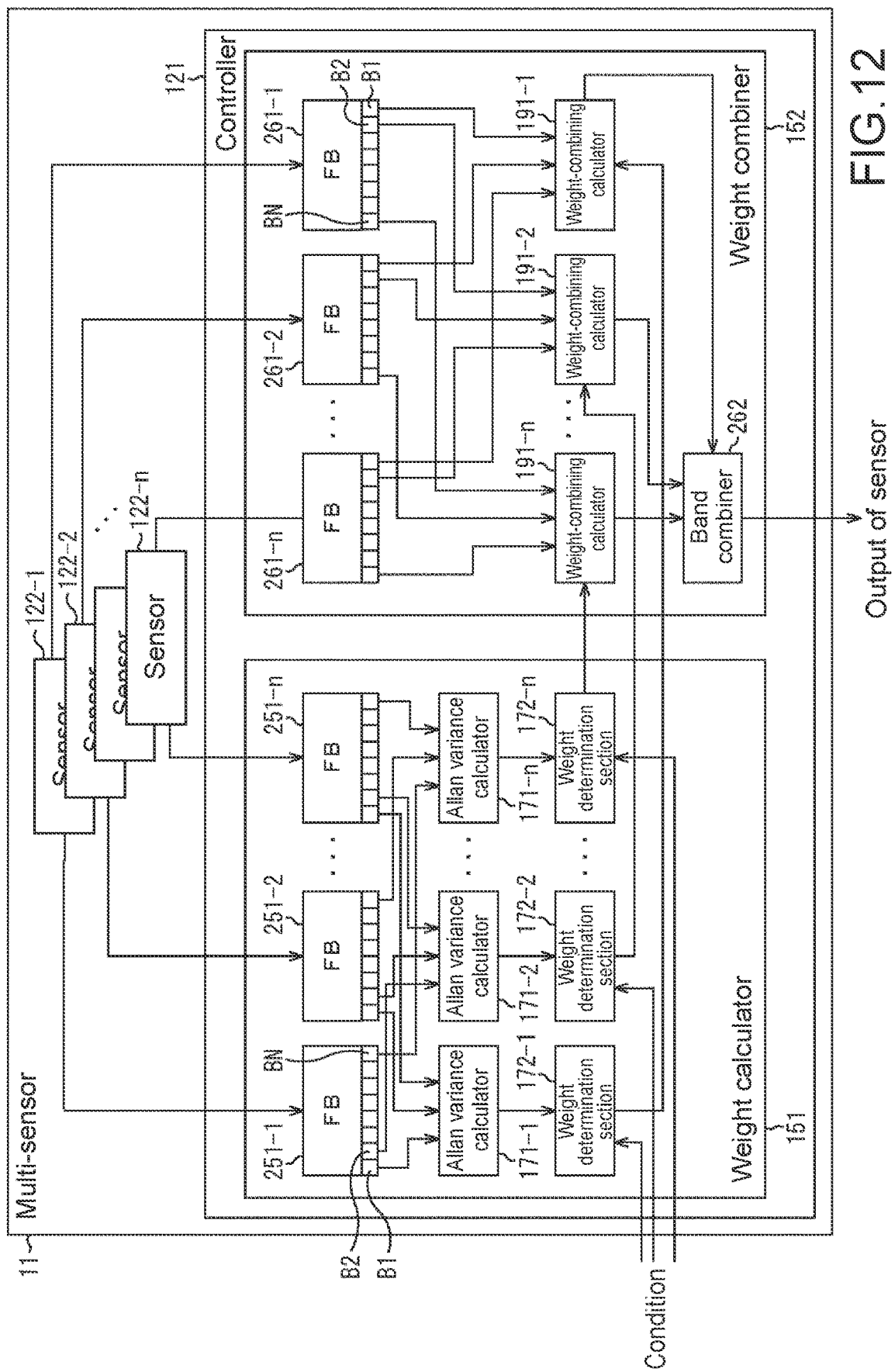
FIG. 12 illustrates a third embodiment of the functions implemented by the multi-sensor of FIG. 4.
Figure 13:
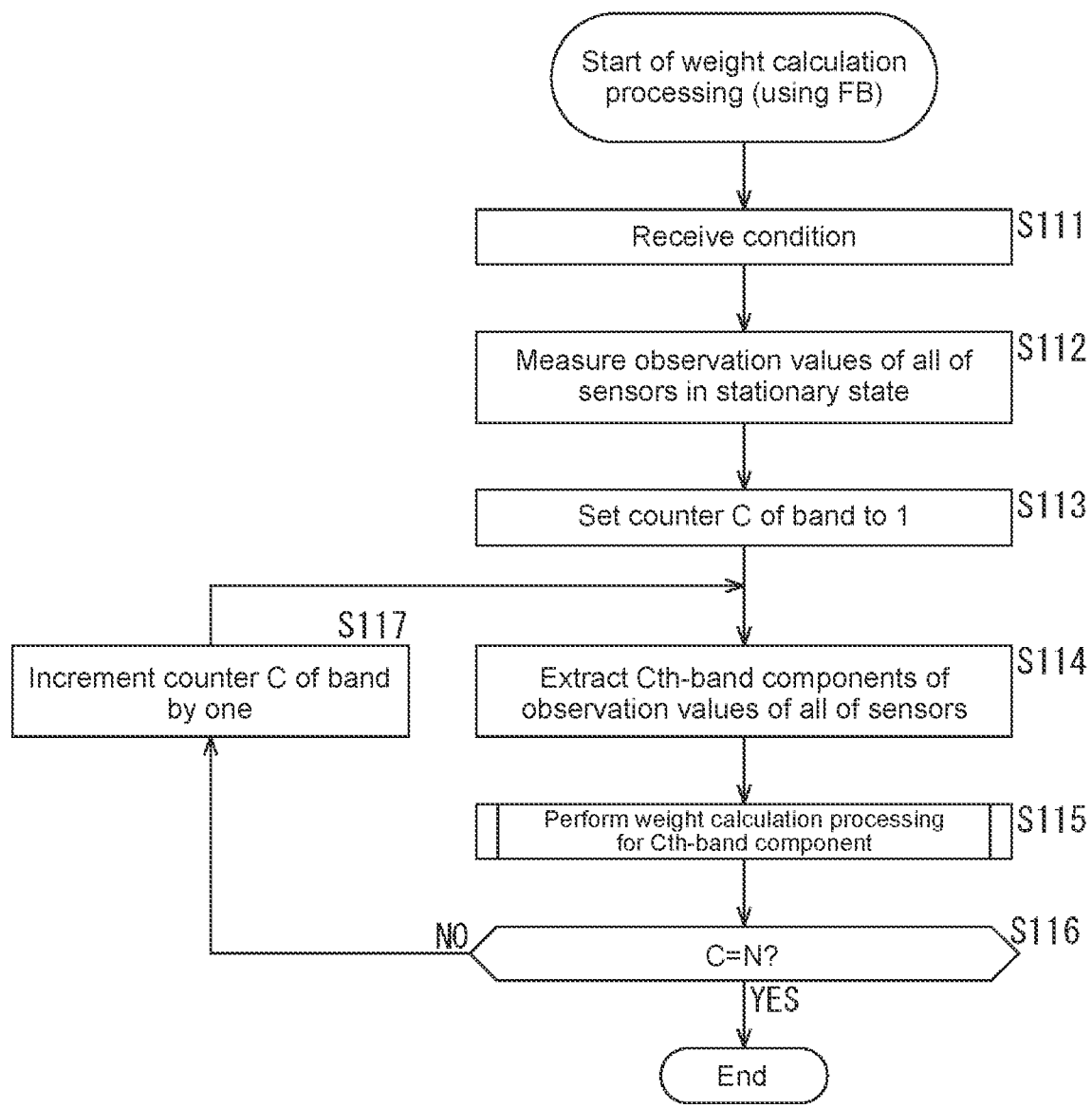
FIG. 13 is a flowchart illustrating the weight calculation processing (Part 3) performed by the multi-sensor of FIG. 12.
Figure 14:
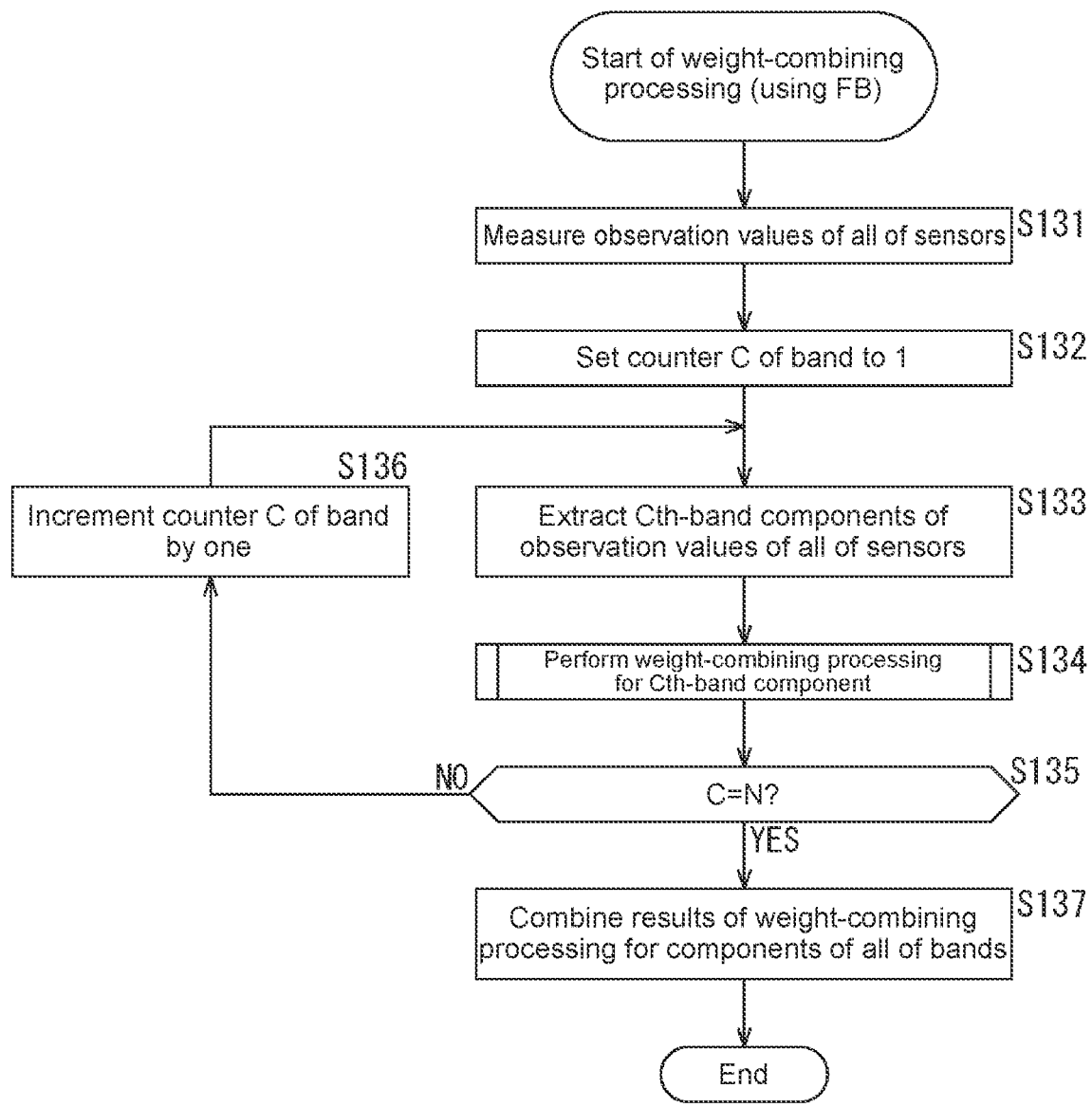
FIG. 14 is a flowchart illustrating the weight-combining processing (Part 3) performed by the multi-sensor of FIG. 12.

FIG. 12 illustrates a configuration example of the multi-sensor 11 in which the band is divided into a larger number of bands using a filter bank (FB); an Allan variance is obtained, a weight is set according to a condition, and weight-combining is performed with respect to each of the larger number of bands; and then band-combining is performed on results of the weight-combinings performed on all of the larger number of bands.

Note that, in the multi-sensor 11 of FIG. 12, a component having the same function as the component included in the multi-sensor 11 of FIG. 5 or 9 is denoted by the same reference numeral as that of FIG. 5 or 9, and a description thereof is omitted as appropriate.

Instead of the HPFs 211 and 231 and the LPFs 212 and 232 of FIG. 9, the multi-sensor 11 of FIG. 12 includes filter banks (hereinafter also simply referred to as FBs) 251-1 to 25-$n$ and 261-1 to 261-$n$.

Further, each FB 251 divides the band into N bands. The FB 251 outputs a highest band B1 to the Allan variance calculator 171-1, outputs a second highest band B2 to the Allan variance calculator 171-2, . . . , and outputs an nth band BN to the Allan variance calculator 171-$n$.

Note that the bands B1, B2, . . . , and BN that are outputs of the FB 251 for the respective bands are only illustrated for the FB 251-1 in the figure, and are not illustrated for the FB 251-2 and 251-$n$. However, the illustrations thereof are merely omitted, and the same applies to the FB 251-2 and 251-$n$.

Then, each of the Allan variance calculators 171-1 to 171-$n$ calculates Allan variances of observation values of the sensors 122-1 to 122-$n$ in a corresponding one of the bands, and outputs the calculated Allan variances to a corresponding one of the weight determination sections 172-1 to 172-$n$.

Each of the weight determination sections 172-1 to 172-$n$ sets weights for the sensors 122-1 to 122-$n$ with respect to the corresponding band on the basis of a condition for the corresponding band and on the basis of the noise characteristics of the respective sensors 122-1 to 122-$n$, and outputs the weights to the corresponding one of the weight-combining calculating sections 191-1 to 191-$n$ of the weight-combining section 152.

Further, each FB 261 divides the band into N bands corresponding to the respective FBs 251. The FB 261 outputs a highest band B1 to the weight-combining calculator 191-1, outputs a second highest band B2 to the weight-combining calculator 191-2, . . . , and outputs an nth band BN to the weight-combining calculator 191-$n$.

Note that the bands B1, B2, . . . , and BN that are outputs of the FB 261 for the respective bands are only illustrated for the FB 261-1 in the figure, and are not illustrated for the FB 261-2 and 261-$n$. However, the illustrations thereof are merely omitted, and the same applies to the FB 261-2 and 261-$n$.

Each of the weight-combining calculators 191-1 to 191-$n$ performs weight-combining on observation values of the sensors 122-1 to 122-$n$ in a corresponding one of the bands on the basis of the weights supplied by a corresponding one of the weight determination sections 172-1 to 172-$n$, and outputs a result of the weight-combining to the band combiner 262.

The band combiner 262 performs band-combining on the results of the weight-combinings, each result of the weight-combining being obtained by the weight-combining being performed on the observation values of the sensors 122-1 to 122-$n$ in the corresponding one of the bands and being supplied by a corresponding one of the weight-combining calculators 191-1 to 191-$n$. Then, the band combiner 262 outputs an obtained value as an observation value of the multi-sensor 11.

According to such a configuration, weights are appropriately set and weight-combining is performed with respect to each of the plurality of bands. This makes it possible to perform weight-combining depending on a condition and the noise characteristics of the respective sensors 122-1 to 122-*n* for each band.

Note that the example of performing combining using an HPF and an LPF has been described above. However, the use of a notch filter, a bandpass filter (BPF), or the like makes it possible to achieve an optimal bias stability or low noise when each of the sensors 122-1 to 122-*n* has certain frequency characteristics. In other words, for example, when there is a reduction in the accuracy only in a specific frequency band in a specific sensor 122 from among the sensors 122-1 to 122-*n*, the filter may also be used as a complementary filter such that at least one sensor other than the specific sensor compensates for the specific frequency band with a reduced accuracy.

For example, the case in which there exist three sensors 122-1 to 122-3, and there is a reduction in the detection accuracy in the sensor 122-1 only with respect to a range of a frequency band A for some reason, is discussed as a specific example.

In this case, when results of detections performed by the sensors 122-1 to 122-3 are combined with respect to the frequency band A similarly to the case of a band other than the frequency band A, this may result in a reduction in the accuracy in the combined detection results due to the reduction in the accuracy in detection performed by the sensor 122-1.

In such a case, only for detection results in the frequency band A, a weight for the sensor 122-1 is reduced, and a weight for at least one of the sensors 122-2 and 122-3 is increased. Then, the respective detection results are combined.

This makes it possible to cover a reduction in the accuracy in detection performed by the sensor 122-1 in the frequency band A with a result of detection performed by at least one of the sensors 122-2 and 122-3, and thus to suppress a reduction in the detection accuracy in a result of combining the results of detections performed by the sensors 122-1 to 122-3.

<Weight Calculation Processing (Part 3)>

Next, the weight calculation processing performed by the multi-sensor 11 of FIG. 12 using an FB is described.

In Step S111, the weight determination sections 172-1 to 172-*n* of the weight calculator 151 respectively receive inputs of conditions from a user. In this case, each of the weight determination sections 172-1 to 172-*n* may receive inputs of conditions for bands B1 to BN in the FB 251, the conditions for the bands B1 to BN being independent of each other.

In Step S112, the FB 251-1 to 251-*n* of the weight calculator 151 respectively measure observation values of the respective sensors 122-1 to 122-*n* in a stationary state.

In Step S113, the weight calculator 151 initializes, to one, a counter C that counts a band.

In Step S114, each of the FBs 251-1 to 251-*n* performs processing of extracting a Cth-band component from among the observation value in the stationary state, and outputs the extracted component of a Cth band BC to the Allan variance calculator 171-1.

In Step S115, the Allan variance calculator 171-1 and the weight determination section 172-1 perform weight calculation processing for a Cth-band component to calculate weights for the respective sensors 122-1 to 122-*n* with respect to the components of the Cth band BC based on the measured observation values, and output the weights to the weight-combining calculator 191-1.

Note that the weight calculation processing for a Cth-band component is weight calculation processing performed in order to obtain weights for the respective sensors 122-1 to 122-*n* with respect to components of the Cth band BC from the respective sensors 122-1 to 122-*n*, and virtually corresponds to the processes of Steps S13 and S14 of FIG. 6 or the processes of Steps S33 to S39 of FIG. 7. Thus, a description thereof is omitted.

In Step S116, the weight calculator 151 determines whether the counter C is N, which is the number of bands, and the process moves on to Step S117 when C=N is not satisfied.

In Step S117, the weight calculator 151 increments the counter C by one, and the process returns to Step S114.

In other words, the processes of Steps S114 to S117 are repeated until weights are set for each of the N bands.

Then, when the weights for each of the N bands are set and when it is determined, in Step S116, that the counter C=N is satisfied, the process is terminated.

In this case, the weight determination sections 172-1 to 172-*n* may perform setting to limit the number of sensors 122 to be used. Further, with respect to the limit on the number of sensors 122 to be used from among the sensors 122-1 to 122-*n*, the number of sensors 122 to be used may be different for each band.

This enables the user to combine appropriate observation values depending on the noise characteristics of an individual sensor 122 with respect to the type of noise the user is aware of under the condition that the time window length $\tau$ is specified, or with respect to noise the user is not aware of under the condition that the time window length $\tau$ is not specified.

Further, it is possible to perform weight-combining according to independent noise characteristics for each of the components of a plurality of bands.

<Weight-Combining Processing (Part 3)>

Next, the weight calculation processing performed by the multi-sensor 11 of FIG. 12 using the FB is described.

In Step S131, the FB 261-1 to 261-*n* of the weight combiner 152 respectively measure observation values of the sensors 122-1 to 122-*n*.

In Step S132, the weight combiner 152 initializes, to one, a counter C that counts a band.

In Step S133, each of the FB 261-1 to 261-*n* performs processing of extracting a Cth-band component from among the observation value in the stationary state, and outputs the extracted component of the Cth band BC to the weight-combining calculation 191-N.

In Step S134, the weight-combining calculator 191-N performs weight-combining processing for a Cth-band component to perform weight-combining on the measured observation values using the weights with respect to the components of the Cth band BC, each weight being obtained by the weight calculation processing described above being performed, and outputs a result of the weight-combining to the band combiner 262.

Note that the process of Step S134 virtually corresponds to the process of Step S52 of FIG. 8 with respect to a component of the Cth band BC.

In Step S135, the weight combiner 152 determines whether the counter C is N, which is the number of bands, and the process moves on to Step S136 when C=N is not satisfied.

In Step S136, the weight combiner 152 increments the counter C by one, and the process returns to Step S133.

In other words, the processes of Steps S133 to S136 are repeated until weights are set for each of the N bands.

Then, when the weights for each of the N bands are set and when it is determined, in Step S135, that the counter C=N is satisfied, the process moves on to Step S137.

In Step S137, the band combiner 262 combines the weight-combining results of the respective band components from the observation values of the sensors 122-1 to 122-$n$ to output a value obtained by the combining as an observation value of the multi-sensor 11, the weight-combining results being respectively supplied by the weight-combining calculators 191-1 to 191-$n$.

This enables the user to combine appropriate observation values depending on the noise characteristics of an individual sensor 122 with respect to the type of noise the user is aware of under the condition that the time window length $\tau$ is specified, or with respect to noise the user is not aware of under the condition that the time window length $\tau$ is not specified.

Further, it is possible to perform weight-combining according to independent noise characteristics for each of the components of a plurality of bands.

5. Example in which Series of Processes is Performed Using Software

Note that the series of processes described above can be performed using hardware or software. When the series of processes is performed using software, a program included in the software is installed on a computer from a recording medium. Examples of the computer include a computer incorporated into dedicated hardware, and a computer such as a general-purpose computer that is capable of performing various functions by various programs being installed thereon.

Figure 15:
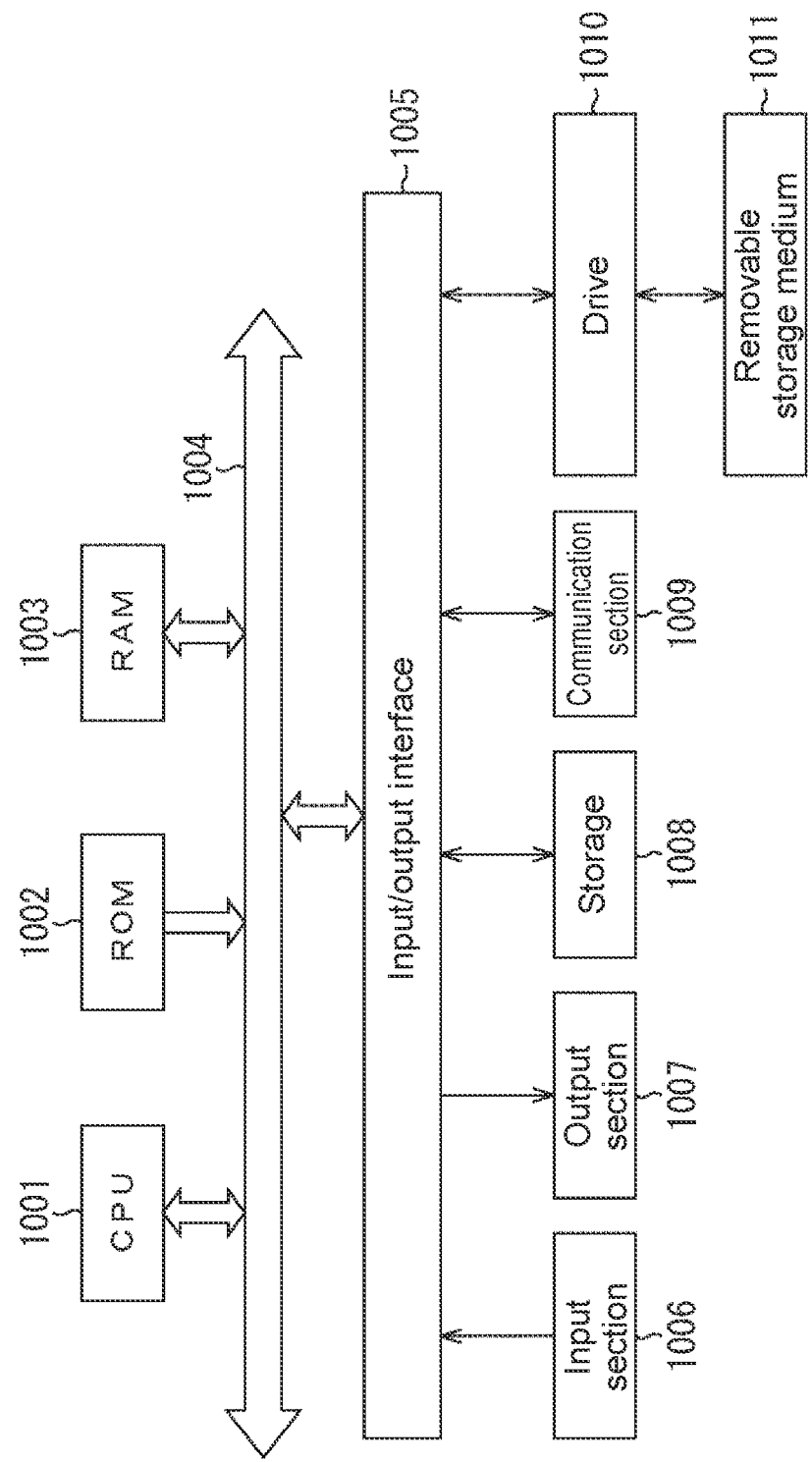
FIG. 15 illustrates a configuration example of a general-purpose personal computer.

FIG. 15 illustrates a configuration example of a general-purpose computer. This personal computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

An input section 1006, an output section 1007, a storage 1008, and a communication section 1009 are connected to the input/output interface 1005. The input section 1006 includes input devices such as a keyboard and a mouse that are used by a user to input an operation command. The output section 1007 outputs a processing operation screen and an image of a processing result to a display device. The storage 1008 includes, for example, a hard disk drive that stores therein a program and various data. The communication section 1009 includes, for example, a local area network (LAN) adapter, and performs communication processing through a network as represented by the Internet. Further, a drive 1010 is connected to the input/output interface 1005. The drive 1010 reads data from and writes data into a removable medium 1011 such as a magnetic disk (including a flexible disk), an optical disk (including a compact disc read-only memory (CD-ROM) and a digital versatile disc (DVD)), a magneto-optical disk (including a mini disc (MD)), or a semiconductor memory.

The CPU 1001 performs various processes in accordance with a program stored in a ROM 1002, or in accordance with a program that is read from the removable medium 1011 such as a magnetic disk, an optical disk, a magneto-optical disk, or a semiconductor memory to be installed on the storage 1008, and is loaded into a RAM 1003 from the storage 1008. Data necessary for the CPU 1001 to perform various processes is also stored in the RAM 1003 as necessary.

In the computer having the configuration described above, the series of processes described above is performed by the CPU 1001 loading, for example, a program stored in the storage 1008 into the RAM 1003 and executing the program via the input/output interface 1005 and the bus 1004.

For example, the program executed by the computer (the CPU 1001) can be provided by being stored in the removable medium 1011 serving as, for example, a package medium. Further, the program can be provided via a wired or wireless transmission medium such as a local area network, the Internet, or digital satellite broadcasting.

In the computer, the program can be installed on the storage 1008 via the input/output interface 1005 by the removable medium 1011 being mounted on the drive 1010. Further, the program can be received by the communication section 1009 via the wired or wireless transmission medium to be installed on the storage 1008. Moreover, the program can be installed in advance on the ROM 1002 or the storage 1008.

Note that the program executed by the computer may be a program in which processes are chronologically performed in the order of the description herein, or may be a program in which processes are performed in parallel or a process is performed at a necessary timing such as a timing of calling.

Note that the function of the controller 121 of FIG. 4 is implemented by the CPU 1001 of FIG. 15.

Further, the system as used herein refers to a collection of a plurality of components (such as apparatuses and modules (parts)) and it does not matter whether all of the components are in a single housing. Thus, a plurality of apparatuses accommodated in separate housings and connected to one another via a network, and a single apparatus in which a plurality of modules is accommodated in a single housing are both systems.

Note that the embodiment of the present disclosure is not limited to the examples described above, and various modifications may be made thereto without departing from the scope of the present disclosure.

For example, the present disclosure may also have a configuration of cloud computing in which a single function is shared to be cooperatively processed by a plurality of apparatuses via a network.

Further, the respective steps described using the flowcharts described above may be shared to be performed by a plurality of apparatuses, in addition to being performed by a single apparatus.

Moreover, when a single step includes a plurality of processes, the plurality of processes included in the single step may be shared to be performed by a plurality of apparatuses, in addition to being performed by a single apparatus.

Note that the present disclosure may also take the following configurations.

<1> An information processing apparatus, including
   a weight combiner that
      combines respective observation values of a plurality of sensors using a sum of products of the observation values of the plurality of sensors and weights, each weight being calculated for a corresponding one of the plurality of sensors on the basis of the observation value of the corresponding one of the plurality of sensors and characteristics of the corresponding one of the plurality of sensors, and
      outputs a value obtained by the combining as a combining observation value.

<2> The information processing apparatus according to <1>, further including
a weight calculator that calculates the weight for each of the plurality of sensors on the basis of the characteristics of the sensor, in which
the weight combiner combines the respective observation values of the plurality of sensors using a sum of products of the observation values of the plurality of sensors and the weights each calculated by the weight calculator for a corresponding one of the plurality of sensors, and outputs a value obtained by the combining as the combining observation value.

<3> The information processing apparatus according to <2>, in which
the weight calculator further includes
an Allan variance calculator that calculates an Allan variance of the observation value of each of the plurality of sensors as the characteristics of the sensor, and
a weight determination section that calculates and determines the weight for the sensor on the basis of the Allan variance calculated by the Allan variance calculator.

<4> The information processing apparatus according to <3>, in which
the weight determination section calculates and determines the weight for each of the plurality of sensors with which a weighted sum of the Allan variances of the respective observation values of the plurality of sensors is smallest.

<5> The information processing apparatus according to <4>, in which
the weight determination section calculates and determines the weight for each of the plurality of sensors on the basis of an Allan variance represented using a noise parameter based on a noise model, the noise parameter based on the noise model being a noise parameter with which a sum of differences is smallest, each difference being a difference between the Allan variance of the observation value of the sensor and the Allan variance represented using the noise parameter based on the noise model.

<6> The information processing apparatus according to <5>, in which
the weight determination section calculates a time window length and the noise parameter based on the noise model with respect to the time window length, the noise parameter based on the noise model with respect to the time window length being a noise parameter of the Allan variance represented using the noise parameter based on the noise model with respect to the time window length, the time window length and the noise parameter based on the noise model with respect to the time window length being a time window length and a noise parameter with which the sum of the differences is smallest, each difference being a difference between the Allan variance of the observation value of each of the plurality of sensors and the Allan variance represented using the noise parameter based on the noise model, and
the weight determination section calculates and determines the weight for the sensor on the basis of the Allan variance being represented using the noise parameter based on the noise model and being specified by the calculated time window length and noise parameter.

<7> The information processing apparatus according to <3>, further including
an input section that receives an input of a condition for the combining observation value, in which
the weight determination section calculates and determines the weight for each of the plurality of sensors with which a weighted sum of Allan variances depending on the condition is smallest, the Allan variances depending on the condition being from among the Allan variances of the respective observation values of the plurality of sensors.

<8> The information processing apparatus according to <3>, in which
a condition for the combining observation value includes a time window length of the Allan variance of the observation value of each of the plurality of sensors, and
the weight determination section calculates the weight for the sensor with which a weighted sum of Allan variances for the time window length is smallest, the Allan variances for the time window length being from among the Allan variances of the respective observation values of the plurality of sensors.

<9> The information processing apparatus according to <8>, in which
the condition for the combining observation value includes the number of sensors to be operated from among the plurality of sensors, and
on the basis of the Allan variances of the respective observation values of the plurality of sensors, the weight determination section calculates and determines the weight for each sensor to be operated, the weight for each sensor to be operated being a weight with which a weighted sum of the Allan variances for the time window length is smallest, the weighted sum being a weighted sum when the weight for the sensor not to be operated is set to zero.

<10> The information processing apparatus according to <2>, in which
the weight calculator includes
a first high-frequency-component extraction section that extracts high-frequency components of the respective observation values of the plurality of sensors,
a first low-frequency-component extraction section that extracts low-frequency components of the respective observation values of the plurality of sensors,
a high-frequency-component weight determination section that calculates and determines a weight for the high-frequency component extracted by the first high-frequency-component extraction section, and
a low-frequency-component weight determination section that calculates and determines a weight for the low-frequency component extracted by the first low-frequency-component extraction section,
the weight combiner includes
a second high-frequency-component extraction section that extracts the high-frequency components of the respective observation values of the plurality of sensors,
a second low-frequency-component extraction section that extracts the low-frequency components of the respective observation values of the plurality of sensors, a high-frequency component combiner that combines the high-frequency components of the respective observation values of the plurality of sensors that are extracted by the second high-frequency-component extraction section, using a sum of products of the high-frequency components of the observation values of the plurality of sensors, and the weights each determined by the high-frequency-component weight determination section for a corresponding one of the plurality of sensors, and outputs a value obtained by the combining as a high-frequency-component combining value, and a low-frequency component combiner that combines the low-frequency components of the respective observation values of the plurality of sensors that are extracted by the second low-frequency-component extraction section, using a sum of products of the low-frequency components of the observation values of the plurality of sensors, and the weights each determined by the low-frequency-component weight determination section for a corresponding one of the plurality of sensors, and outputs a value obtained by the combining as a low-frequency-component combining value, and the information processing apparatus further includes an output combiner that combines the high-frequency-component combining value and the low-frequency-component combining value, and outputs a value obtained by the combining as the combining observation value.

<11> The information processing apparatus according to <2>, in which the weight calculator includes a first band-component extraction section that extracts components of a plurality of bands of each of the observation values of the plurality of sensors, and a band-component weight determination section that is provided for each of the components of the plurality of bands that are extracted by the first band-component extraction section, the band-component weight determination section calculating and determining weights for the plurality of sensors with respect to a corresponding one of the components of the plurality of bands, the weight combiner includes a second band-component extraction section that extracts the components of the plurality of bands of each of the observation values of the plurality of sensors, and a band component combiner that is provided for each of the components of the plurality of bands that are extracted by the second band-component weight determination section, the band component combiner combining the components of the corresponding one of the plurality of bands using a sum of products of the components of the corresponding one of the plurality of bands and the weights for the plurality of sensors that are determined by the band-component weight determination section provided for the corresponding one of the components of the plurality of bands, the components of the corresponding one of the plurality of bands being components of the corresponding one of the plurality of bands from the respective observation values of the plurality of sensors, the band component combiner outputting a value obtained by the combining as a band component combining value for the component of the corresponding one of the plurality of bands, and the information processing apparatus further includes a band combiner that combines the respective band component combining values for the components of the plurality of bands from the respective observation values of the plurality of sensors, and outputs a value obtained by the combining as the combining observation value.

<12> The information processing apparatus according to any one of <1> to <11>, in which the weight combiner acquires the weight for each of the plurality of sensors from a cloud server with which the weight combiner communicates through a network, the weight being calculated in the cloud server on the basis of the characteristics of the sensor, combines the respective observation values of the plurality of sensors using a sum of products of the observation values of the plurality of sensors and the weights each acquired from the cloud server for a corresponding one of the plurality of sensors, and outputs a value obtained by the combining as the combining observation value.

<13> The information processing apparatus according to any one of <1> to <12>, in which the sensor is an IMU.

<14> An information processing method, including performing weight-combining processing that includes combining respective observation values of a plurality of sensors using a sum of products of the observation values of the plurality of sensors and weights, each weight being calculated for a corresponding one of the plurality of sensors on the basis of the observation value of the corresponding one of the plurality of sensors and characteristics of the corresponding one of the plurality of sensors, and outputting a value obtained by the combining as a combining observation value.

<15> A program that causes a computer to operate as a weight combiner that combines respective observation values of a plurality of sensors using a sum of products of the observation values of the plurality of sensors and weights, each weight being calculated for a corresponding one of the plurality of sensors on the basis of the observation value of the corresponding one of the plurality of sensors and characteristics of the corresponding one of the plurality of sensors, and outputs a value obtained by the combining as a combining observation value.

REFERENCE SIGNS LIST

101 multi-sensor
121 controller
122, 122-1 to 122-$n$ sensor
151 weight calculator
152 weight combiner
171, 171-1 to 171-$n$ Allan variance calculator
172, 172-1 to 172-$n$ weight determination section
191, 191-1 to 191-$n$ weight-combining calculator 211 HPF
212 HPF
231 HPF
232 LPF
232 output combiner
251, 251-1 to 251-n, 261, 261-1 to 261-n filter bank (FB)
262 band combiner

The invention claimed is:

1. An information processing apparatus, comprising:
a weight calculator configured to calculate a respective weight for each respective sensor of a plurality of sensors on a basis of an Allan variance of the respective sensor in relation to Allan variances of other sensors of the plurality of sensors for each frequency band of a plurality of frequency bands;
a weight combiner configured to
combine respective observation values of the plurality of sensors based on the respective weights corresponding to the observation values of the plurality of sensors, the respective weights being calculated for each frequency band of a plurality of frequency bands, and
output a combining observation value for the plurality of sensors corresponding to each frequency band obtained by combining the respective observation values according to the respective weights calculated for the respective sensors corresponding to the frequency band; and
an output section configured to output an image corresponding to the combining observation value on a display device,
wherein the output combining observation value is further obtained by combining observation values of the plurality of sensors within each weighted frequency band according to the calculated weights of the plurality of sensors for each frequency band,
wherein the weight calculator calculates the respective weight for each respective sensor of the plurality of sensors with which a weighted sum of Allan variances corresponding to respective observation values, depending on a condition directed to the combining observation value, is smallest,
wherein the weight calculator calculates the weights of the plurality of sensors within a length of time that is determined according to an application in which each output combining observation value is used, and
wherein the weight combiner, the weight calculator, and the communication section are each implemented via at least one processor.

2. The information processing apparatus according to claim 1,
wherein the weight combiner combines the respective observation values of the plurality of sensors using a sum of products of the observation values of the plurality of sensors and the weights each calculated by the weight calculator for a corresponding one of the plurality of sensors.

3. The information processing apparatus according to claim 2,
wherein the weight calculator further includes
an Allan variance calculator configured to calculate the Allan variance of the observation value of each of the plurality of sensors, and
a weight determination section that calculates the respective weight for each respective sensor on a basis of the Allan variance calculated by the Allan variance calculator.

4. The information processing apparatus according to claim 3,
wherein the weight determination section calculates the respective weight for each respective sensor of the plurality of sensors on a basis of the Allan variance represented using a noise parameter based on a noise model, the noise parameter based on the noise model being a noise parameter with which a sum of differences is smallest, each difference being a difference between the Allan variance of the observation value of the sensor and the Allan variance represented using the noise parameter based on the noise model.

5. The information processing apparatus according to claim 4,
wherein the weight determination section is further configured to calculate a time window length and the noise parameter based on the noise model with respect to the time window length, the noise parameter based on the noise model with respect to the time window length being a noise parameter of the Allan variance represented using the noise parameter based on the noise model with respect to the time window length, the time window length and the noise parameter based on the noise model with respect to the time window length being a time window length and a noise parameter with which the sum of the differences is smallest, each difference being a difference between the Allan variance of the observation value of each of the plurality of sensors and the Allan variance represented using the noise parameter based on the noise model, and
wherein the weight determination section calculates the respective weight for each respective sensor on a basis of the Allan variance being represented using the noise parameter based on the noise model and being specified by the calculated time window length and noise parameter.

6. The information processing apparatus according to claim 3, further comprising:
an input section configured to receive an input of the condition directed to the combining observation value,
wherein the input section is implemented via at least one processor.

7. The information processing apparatus according to claim 3,
wherein the condition directed to the combining observation value includes a time window length of the Allan variance of the observation value of each of the plurality of sensors, and
the weight determination section calculates the respective weight for each respective sensor with which a weighted sum of Allan variances for the time window length is smallest, the Allan variances for the time window length being from among the Allan variances of the respective observation values of the plurality of sensors.

8. The information processing apparatus according to claim 7,
wherein the condition directed to the combining observation value includes a number of sensors to be operated from among the plurality of sensors, and
wherein on a basis of the Allan variances of the respective observation values of the plurality of sensors, the weight determination section calculates the respective weight for each respective sensor to be operated, the respective weight for each respective sensor to be operated being a weight with which the weighted sum of the Allan variances for the time window length is smallest, the weighted sum being a weighted sum when the respective weight for each respective sensor not to be operated is set to zero.

9. The information processing apparatus according to claim 2,
wherein the weight calculator includes
a first high-frequency-component extraction section configured to extract high-frequency components of the respective observation values of the plurality of sensors,
a first low-frequency-component extraction section configured to extract low-frequency components of the respective observation values of the plurality of sensors,
a high-frequency-component weight determination section configured to calculate a weight for the high-frequency component extracted by the first high-frequency-component extraction section, and
a low-frequency-component weight determination section configured to calculate a weight for the low-frequency component extracted by the first low-frequency-component extraction section,
wherein the weight combiner includes
a second high-frequency-component extraction section configured to extract the high-frequency components of the respective observation values of the plurality of sensors,
a second low-frequency-component extraction section configured to extract the low-frequency components of the respective observation values of the plurality of sensors,
a high-frequency component combiner configured to combine the high-frequency components of the respective observation values of the plurality of sensors that are extracted by the second high-frequency-component extraction section, using a sum of products of the high-frequency components of the observation values of the plurality of sensors, and the weights each determined by the high-frequency-component weight determination section for a corresponding one of the plurality of sensors, and output a value obtained by the combining as a high-frequency-component combining value, and
a low-frequency component combiner configured to combine the low-frequency components of the respective observation values of the plurality of sensors that are extracted by the second low-frequency-component extraction section, using a sum of products of the low-frequency components of the observation values of the plurality of sensors, and the weights each determined by the low-frequency-component weight determination section for a corresponding one of the plurality of sensors, and output a value obtained by the combining as a low-frequency-component combining value,
wherein the information processing apparatus further comprises an output combiner configured to
combine the high-frequency-component combining value and the low-frequency-component combining value, and
output a value obtained by the combining as the combining observation value, and
wherein the output combiner is implemented via at least one processor.

10. The information processing apparatus according to claim 2,
wherein the weight calculator includes
a first band-component extraction section configured to extract components of a plurality of bands of each of the observation values of the plurality of sensors, and
a band-component weight determination section that is provided for each of the components of the plurality of bands that are extracted by the first band-component extraction section, the band-component weight determination section calculating weights for the plurality of sensors with respect to a corresponding one of the components of the plurality of bands,
wherein the weight combiner includes
a second band-component extraction section configured to extract the components of the plurality of bands of each of the observation values of the plurality of sensors, and
a band component combiner that is provided for each of the components of the plurality of bands that are extracted by the second band-component weight determination section, the band component combiner combining the components of the corresponding one of the plurality of bands using a sum of products of the components of the corresponding one of the plurality of bands and the weights for the plurality of sensors that are determined by the band-component weight determination section provided for the corresponding one of the components of the plurality of bands, the components of the corresponding one of the plurality of bands being components of the corresponding one of the plurality of bands from the respective observation values of the plurality of sensors, the band component combiner outputting a value obtained by the combining as a band component combining value for the component of the corresponding one of the plurality of bands,
wherein the information processing apparatus further comprises a band combiner configured to
combine the respective band component combining values for the components of the plurality of bands from the respective observation values of the plurality of sensors, and
output a value obtained by the combining as the combining observation value, and
wherein the band combiner is implemented via at least one processor.

11. The information processing apparatus according to claim 1, wherein
the weight combiner is further configured to
acquire the respective weight for each respective sensor of the plurality of sensors from a cloud server with which the weight combiner communicates through a network, the respective weight being calculated in the cloud server on a basis of the Allan variance of the sensor, and
combine the respective observation values of the plurality of sensors using a sum of products of the observation values of the plurality of sensors and the weights each acquired from the cloud server for a corresponding one of the plurality of sensors.

12. The information processing apparatus according to claim 1,
wherein each sensor includes an inertial measurement unit (IMU).

13. The information processing apparatus according to claim 1,
wherein the condition directed to the combining observation value includes a number of the plurality of sensors to be operated.

14. An information processing method, comprising:
calculating a respective weight for each respective sensor of a plurality of sensors on a basis of an Allan variance of the respective sensor in relation to Allan variances of other sensors of the plurality of sensors for each frequency band of a plurality of frequency bands;
combining respective observation values of the plurality of sensors based on the respective weights corresponding to the observation values of the plurality of sensors, the respective weights being calculated for each frequency band of a plurality of frequency bands;
outputting a combining observation value for the plurality of sensors corresponding to each frequency band obtained by combining the respective observation values according to the respective weights calculated for the respective sensors corresponding to the frequency band; and
outputting an image corresponding to the combining observation value on a display device,
wherein the output combining observation value is further obtained by combining observation values of the plurality of sensors within each weighted frequency band according to the calculated weights of the plurality of sensors for each frequency band,
wherein the calculating of the respective weight for each respective sensor of the plurality of sensors includes calculating the respective weight with which a weighted sum of Allan variances corresponding to respective observation values, depending on a condition directed to the combining observation value, is smallest, and
wherein the weights of the plurality of sensors are calculated within a length of time that is determined according to an application in which each output combining observation value is used.

15. A non-transitory computer-readable storage medium having embodied thereon a program, which when executed by a computer causes the computer to execute a method, the method comprising:
calculating a respective weight for each respective sensor of a plurality of sensors on a basis of an Allan variance of the respective sensor in relation to Allan variances of other sensors of the plurality of sensors for each frequency band of a plurality of frequency bands;
combining respective observation values of the plurality of sensors based on the respective weights corresponding to the observation values of the plurality of sensors, the respective weights being calculated for each frequency band of a plurality of frequency bands;
outputting a combining observation value for the plurality of sensors corresponding to each frequency band obtained by combining the respective observation values according to the respective weights calculated for the respective sensors corresponding to the frequency band; and
outputting an image corresponding to the combining observation value on a display device,
wherein the output combining observation value is further obtained by combining observation values of the plurality of sensors within each weighted frequency band according to the calculated weights of the plurality of sensors for each frequency band,
wherein the calculating of the respective weight for each respective sensor of the plurality of sensors includes calculating the respective weight with which a weighted sum of Allan variances corresponding to respective observation values, depending on a condition directed to the combining observation value, is smallest, and
wherein the weights of the plurality of sensors are calculated within a length of time that is determined according to an application in which each output combining observation value is used.

* * * * *